United States Patent
Longo et al.

(10) Patent No.: US 11,327,910 B2
(45) Date of Patent: *May 10, 2022

(54) QUALITY OF SERVICE POLICY SETS

(71) Applicant: NetApp, Inc., Sunnyvale, CA (US)

(72) Inventors: Austino Longo, Lafayette, CO (US); Jared Cantwell, Boulder, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/203,094

(22) Filed: Mar. 16, 2021

(65) Prior Publication Data
US 2021/0200702 A1 Jul. 1, 2021

Related U.S. Application Data

(63) Continuation of application No. 16/867,418, filed on May 5, 2020, now Pat. No. 10,997,098, which is a (Continued)

(51) Int. Cl.
*G06F 3/06* (2006.01)
*G06F 11/34* (2006.01)
(Continued)

(52) U.S. Cl.
CPC .......... *G06F 13/1689* (2013.01); *G06F 3/061* (2013.01); *G06F 3/067* (2013.01);
(Continued)

(58) Field of Classification Search
CPC .. G06F 13/1689; G06F 11/3433; G06F 13/16; G06F 3/0659; G06F 3/067;
(Continued)

(56) References Cited

U.S. PATENT DOCUMENTS 5,138,697 A 8/1992 Yamamoto et al.
5,375,216 A 12/1994 Moyer et al.
(Continued)

FOREIGN PATENT DOCUMENTS

EP 0726521 A2 8/1996
EP 1970821 A1 9/2008
(Continued)

OTHER PUBLICATIONS

Agrawal, et al., "Design Tradeoffs for SSD Performance," USENIX Annual Technical Conference, 2008, 14 Pages.
(Continued)

*Primary Examiner* — Idriss N Alrobaye
*Assistant Examiner* — Henry W Yu
(74) *Attorney, Agent, or Firm* — Jaffery Watson Mendonsa & Hamilton LLP

(57) ABSTRACT

Disclosed are systems, computer-readable mediums, and methods for managing input/output operations within a system including at least one client and a storage system. A processor receives information regarding allocated input-output operations (IOPS) associated with a client accessing a storage system storing client data. The information includes a number of allocated total IOPS, a number of allocated read IOPS, and a number of allocated write IOPS. The processor also receives a requested number of write IOPS associated with the at least one client's request to write to the storage system. The processor determines a target write IOPS based on the number of allocated total IOPS, the number of allocated write IOPS and the requested number of write IOPS, and executes the determined target write IOPS within the first time period.

28 Claims, 11 Drawing Sheets

Related U.S. Application Data continuation of application No. 15/270,973, filed on Sep. 20, 2016, now Pat. No. 10,642,763.

(51) Int. Cl.
| | |
|---|---|
| *G06F 13/16* | (2006.01) |
| *G06F 13/40* | (2006.01) |
| *H04L 29/08* | (2006.01) |
| *H04L 67/10* | (2022.01) |
| *H04L 67/00* | (2022.01) |

(52) U.S. Cl.
CPC ........ *G06F 3/0659* (2013.01); *G06F 11/3433* (2013.01); *G06F 13/16* (2013.01); *G06F 13/4068* (2013.01); *H04L 67/00* (2013.01); *H04L 67/10* (2013.01); *G06F 11/3419* (2013.01); *G06F 2206/1012* (2013.01)

(58) Field of Classification Search
CPC .. G06F 3/061; G06F 13/4068; G06F 11/3419; G06F 2206/1012; H04L 67/10; H04L 67/00
USPC ................. 710/17–18, 29, 33, 107, 110
See application file for complete search history.

(56) References Cited

U.S. PATENT DOCUMENTS

| | | |
|---|---|---|
| 5,459,857 A | 10/1995 | Ludlam et al. |
| 5,511,190 A | 4/1996 | Sharma et al. |
| 5,542,089 A | 7/1996 | Lindsay et al. |
| 5,592,432 A | 1/1997 | Vishlitzky et al. |
| 5,603,001 A | 2/1997 | Sukegawa et al. |
| 5,611,073 A | 3/1997 | Malpure et al. |
| 5,734,859 A | 3/1998 | Yorimitsu et al. |
| 5,734,898 A | 3/1998 | He |
| 5,751,993 A | 5/1998 | Ofek et al. |
| 5,860,082 A | 1/1999 | Smith et al. |
| 5,864,698 A | 1/1999 | Krau et al. |
| 5,890,161 A | 3/1999 | Helland et al. |
| 5,937,425 A | 8/1999 | Ban |
| 5,974,421 A | 10/1999 | Krishnaswamy et al. |
| 5,991,862 A | 11/1999 | Ruane |
| 6,047,283 A | 4/2000 | Braun et al. |
| 6,067,541 A | 5/2000 | Raju et al. |
| 6,081,900 A | 6/2000 | Subramaniam et al. |
| 6,219,800 B1 | 4/2001 | Johnson et al. |
| 6,257,756 B1 | 7/2001 | Zarubinsky et al. |
| 6,275,898 B1 | 8/2001 | Dekoning |
| 6,347,337 B1 | 2/2002 | Shah et al. |
| 6,363,385 B1 | 3/2002 | Kedem et al. |
| 6,385,699 B1 | 5/2002 | Bozman et al. |
| 6,397,307 B2 | 5/2002 | Ohran |
| 6,434,555 B1 | 8/2002 | Frolund et al. |
| 6,434,662 B1 | 8/2002 | Greene et al. |
| 6,526,478 B1 | 2/2003 | Kirby |
| 6,553,384 B1 | 4/2003 | Frey et al. |
| 6,560,196 B1 | 5/2003 | Wei |
| 6,567,817 B1 | 5/2003 | Vanleer et al. |
| 6,578,158 B1 | 6/2003 | Deitz et al. |
| 6,604,155 B1 | 8/2003 | Chong, Jr. |
| 6,609,176 B1 | 8/2003 | Mizuno |
| 6,640,312 B1 | 10/2003 | Thomson et al. |
| 6,681,389 B1 | 1/2004 | Engel et al. |
| 6,704,839 B2 | 3/2004 | Butterworth et al. |
| 6,728,843 B1 | 4/2004 | Pong et al. |
| 6,741,698 B1 | 5/2004 | Jensen |
| 6,779,003 B1 | 8/2004 | Midgley et al. |
| 6,795,890 B1 | 9/2004 | Sugai et al. |
| 6,895,500 B1 | 5/2005 | Rothberg |
| 6,904,470 B1 | 6/2005 | Ofer et al. |
| 6,912,645 B2 | 6/2005 | Dorward et al. |
| 6,917,898 B1 | 7/2005 | Kirubalaratnam et al. |
| 6,928,521 B1 | 8/2005 | Burton et al. |
| 6,928,526 B1 | 8/2005 | Zhu et al. |
| 6,961,865 B1 | 11/2005 | Ganesh et al. |
| 7,003,565 B2 | 2/2006 | Hind et al. |
| 7,028,218 B2 | 4/2006 | Schwarm et al. |
| 7,039,694 B2 | 5/2006 | Kampe et al. |
| 7,047,358 B2 | 5/2006 | Lee et al. |
| 7,055,058 B2 | 5/2006 | Lee et al. |
| 7,065,619 B1 | 6/2006 | Zhu et al. |
| 7,093,086 B1 | 8/2006 | Van |
| 7,110,913 B2 | 9/2006 | Monroe et al. |
| 7,152,142 B1 | 12/2006 | Guha et al. |
| 7,167,951 B2 | 1/2007 | Blades et al. |
| 7,174,379 B2 | 2/2007 | Agarwal et al. |
| 7,177,853 B1 | 2/2007 | Ezra et al. |
| 7,188,149 B2 | 3/2007 | Kishimoto et al. |
| 7,191,357 B2 | 3/2007 | Holland et al. |
| 7,219,260 B1 | 5/2007 | De et al. |
| 7,249,150 B1 | 7/2007 | Watanabe et al. |
| 7,251,663 B1 | 7/2007 | Smith |
| 7,257,690 B1 | 8/2007 | Baird |
| 7,305,579 B2 | 12/2007 | Williams |
| 7,325,059 B2 | 1/2008 | Barach et al. |
| 7,334,094 B2 | 2/2008 | Fair |
| 7,334,095 B1 | 2/2008 | Fair et al. |
| 7,366,865 B2 | 4/2008 | Lakshmanamurthy et al. |
| 7,370,048 B2 | 5/2008 | Loeb |
| 7,373,345 B2 | 5/2008 | Carpentier et al. |
| 7,394,944 B2 | 7/2008 | Boskovic et al. |
| 7,395,283 B1 | 7/2008 | Atzmony et al. |
| 7,395,352 B1 | 7/2008 | Lam et al. |
| 7,415,653 B1 | 8/2008 | Bonwick et al. |
| 7,451,167 B2 | 11/2008 | Bali et al. |
| 7,454,592 B1 | 11/2008 | Shah et al. |
| 7,457,864 B2 | 11/2008 | Chambliss et al. |
| 7,464,125 B1 | 12/2008 | Orszag et al. |
| 7,519,725 B2 | 4/2009 | Alvarez et al. |
| 7,526,685 B2 | 4/2009 | Maso et al. |
| 7,529,780 B1 | 5/2009 | Braginsky et al. |
| 7,529,830 B2 | 5/2009 | Fujii |
| 7,543,100 B2 | 6/2009 | Singhal et al. |
| 7,543,178 B2 | 6/2009 | McNeill et al. |
| 7,562,101 B1 | 7/2009 | Jernigan, IV et al. |
| 7,562,203 B2 | 7/2009 | Scott et al. |
| 7,603,391 B1 | 10/2009 | Federwisch et al. |
| 7,603,529 B1 | 10/2009 | Machardy et al. |
| 7,624,112 B2 | 11/2009 | Ganesh et al. |
| 7,644,087 B2 | 1/2010 | Barkai et al. |
| 7,668,885 B2 | 2/2010 | Wittke et al. |
| 7,680,837 B2 | 3/2010 | Yamato |
| 7,681,076 B1 | 3/2010 | Sarma |
| 7,689,716 B2 | 3/2010 | Short et al. |
| 7,701,948 B2 | 4/2010 | Rabje et al. |
| 7,730,153 B1 | 6/2010 | Gole et al. |
| 7,739,614 B1 | 6/2010 | Hackworth |
| 7,743,035 B2 | 6/2010 | Chen et al. |
| 7,757,056 B1 | 7/2010 | Fair |
| 7,797,279 B1 | 9/2010 | Starling et al. |
| 7,805,266 B1 | 9/2010 | Dasu et al. |
| 7,805,583 B1 | 9/2010 | Todd et al. |
| 7,814,064 B2 | 10/2010 | Vingralek |
| 7,817,562 B1 | 10/2010 | Kemeny |
| 7,818,525 B1 | 10/2010 | Frost et al. |
| 7,831,736 B1 | 11/2010 | Thompson |
| 7,831,769 B1 | 11/2010 | Wen et al. |
| 7,849,098 B1 | 12/2010 | Scales et al. |
| 7,849,281 B2 | 12/2010 | Malhotra et al. |
| 7,873,619 B1 | 1/2011 | Faibish et al. |
| 7,899,791 B1 | 3/2011 | Gole |
| 7,917,726 B2 | 3/2011 | Hummel et al. |
| 7,921,169 B2 | 4/2011 | Jacobs et al. |
| 7,921,325 B2 | 4/2011 | Kondo et al. |
| 7,949,693 B1 | 5/2011 | Mason et al. |
| 7,953,878 B1 | 5/2011 | Trimble |
| 7,962,709 B2 | 6/2011 | Agrawal |
| 7,987,167 B1 | 7/2011 | Kazar et al. |
| 7,996,636 B1 | 8/2011 | Prakash et al. |
| 8,055,745 B2 | 11/2011 | Atluri |
| 8,060,797 B2 | 11/2011 | Hida et al. |
| 8,074,019 B2 | 12/2011 | Gupta et al. |

(56) References Cited

U.S. PATENT DOCUMENTS

| | | |
|---|---|---|
| 8,078,918 B2 | 12/2011 | Diggs et al. |
| 8,082,390 B1 | 12/2011 | Fan et al. |
| 8,086,585 B1 | 12/2011 | Brashers et al. |
| 8,089,969 B2 | 1/2012 | Rabie et al. |
| 8,090,908 B1 | 1/2012 | Bolen et al. |
| 8,099,396 B1 | 1/2012 | Novick et al. |
| 8,099,554 B1 | 1/2012 | Solomon et al. |
| 8,122,213 B2 | 2/2012 | Cherian et al. |
| 8,127,182 B2 | 2/2012 | Sivaperuman et al. |
| 8,131,926 B2 | 3/2012 | Lubbers et al. |
| 8,140,821 B1 | 3/2012 | Raizen et al. |
| 8,140,860 B2 | 3/2012 | Haswell |
| 8,145,838 B1 | 3/2012 | Miller et al. |
| 8,156,016 B2 | 4/2012 | Zhang |
| 8,156,290 B1 | 4/2012 | Vanninen et al. |
| 8,156,306 B1 | 4/2012 | Raizen et al. |
| 8,184,807 B2 | 5/2012 | Kato et al. |
| 8,205,065 B2 | 6/2012 | Matze |
| 8,209,587 B1 | 6/2012 | Taylor et al. |
| 8,214,868 B2 | 7/2012 | Hamilton et al. |
| 8,224,935 B1 | 7/2012 | Bandopadhyay et al. |
| 8,225,135 B2 | 7/2012 | Barrall et al. |
| 8,244,978 B2 | 8/2012 | Kegel et al. |
| 8,250,116 B2 | 8/2012 | Mazzagatti et al. |
| 8,261,085 B1 | 9/2012 | Fernandez |
| 8,312,231 B1 | 11/2012 | Li et al. |
| 8,327,103 B1 | 12/2012 | Can et al. |
| 8,341,457 B2 | 12/2012 | Spry et al. |
| 8,369,217 B2 | 2/2013 | Bostica et al. |
| 8,417,987 B1 | 4/2013 | Goel et al. |
| 8,429,096 B1 | 4/2013 | Soundararajan et al. |
| 8,429,282 B1 | 4/2013 | Ahuja et al. |
| 8,452,929 B2 | 5/2013 | Bennett |
| 8,463,825 B1 | 6/2013 | Harty et al. |
| 8,468,368 B2 | 6/2013 | Gladwin et al. |
| 8,484,439 B1 | 7/2013 | Frailong et al. |
| 8,489,811 B1 | 7/2013 | Corbett et al. |
| 8,495,417 B2 | 7/2013 | Jernigan, IV et al. |
| 8,510,265 B1 | 8/2013 | Boone et al. |
| 8,515,965 B2 | 8/2013 | Mital et al. |
| 8,520,855 B1 | 8/2013 | Kohno et al. |
| 8,533,410 B1 | 9/2013 | Corbett et al. |
| 8,539,008 B2 | 9/2013 | Faith et al. |
| 8,543,611 B1 | 9/2013 | Mirtich et al. |
| 8,549,154 B2 | 10/2013 | Colrain et al. |
| 8,555,019 B2 | 10/2013 | Montgomery et al. |
| 8,560,879 B1 | 10/2013 | Goel |
| 8,566,508 B2 | 10/2013 | Borchers et al. |
| 8,566,617 B1 | 10/2013 | Clifford |
| 8,572,091 B1 | 10/2013 | Sivasubramanian et al. |
| 8,577,850 B1 | 11/2013 | Genda et al. |
| 8,583,865 B1 | 11/2013 | Sade et al. |
| 8,589,550 B1 | 11/2013 | Faibish et al. |
| 8,589,625 B2 | 11/2013 | Colgrove et al. |
| 8,595,434 B2 | 11/2013 | Northcutt et al. |
| 8,595,595 B1 | 11/2013 | Grcanac et al. |
| 8,600,949 B2 | 12/2013 | Periyagaram et al. |
| 8,645,664 B1 | 2/2014 | Colgrove et al. |
| 8,645,698 B2 | 2/2014 | Yi et al. |
| 8,671,265 B2 | 3/2014 | Wright |
| 8,706,692 B1 | 4/2014 | Luthra et al. |
| 8,706,701 B1 | 4/2014 | Stefanov et al. |
| 8,712,963 B1 | 4/2014 | Douglis et al. |
| 8,732,426 B2 | 5/2014 | Colgrove et al. |
| 8,745,338 B1 | 6/2014 | Yadav et al. |
| 8,751,763 B1 | 6/2014 | Ramarao |
| 8,762,654 B1 | 6/2014 | Yang et al. |
| 8,775,868 B2 | 7/2014 | Colgrove et al. |
| 8,782,439 B2 | 7/2014 | Resch |
| 8,787,580 B2 | 7/2014 | Hodges et al. |
| 8,799,571 B1 | 8/2014 | Desroches et al. |
| 8,799,601 B1 | 8/2014 | Chen et al. |
| 8,799,705 B2 | 8/2014 | Hallak et al. |
| 8,806,160 B2 | 8/2014 | Colgrove et al. |
| 8,812,450 B1 | 8/2014 | Kesavan et al. |
| 8,824,686 B1 | 9/2014 | Ishii et al. |
| 8,826,023 B1 | 9/2014 | Harmer et al. |
| 8,832,373 B2 | 9/2014 | Colgrove et al. |
| 8,843,711 B1 | 9/2014 | Yadav et al. |
| 8,849,764 B1 | 9/2014 | Long et al. |
| 8,850,108 B1 | 9/2014 | Hayes et al. |
| 8,850,216 B1 | 9/2014 | Mikhailov et al. |
| 8,855,318 B1 | 10/2014 | Patnala et al. |
| 8,856,593 B2 | 10/2014 | Eckhardt et al. |
| 8,868,868 B1 | 10/2014 | Maheshwari et al. |
| 8,874,842 B1 | 10/2014 | Kimmel et al. |
| 8,880,787 B1 | 11/2014 | Kimmel et al. |
| 8,880,788 B1 | 11/2014 | Sundaram et al. |
| 8,892,818 B1 | 11/2014 | Zheng et al. |
| 8,904,137 B1 | 12/2014 | Zhang et al. |
| 8,904,231 B2 | 12/2014 | Coatney et al. |
| 8,922,928 B2 | 12/2014 | Powell |
| 8,930,778 B2 | 1/2015 | Cohen |
| 8,943,032 B1 | 1/2015 | Xu et al. |
| 8,943,282 B1 | 1/2015 | Armangau et al. |
| 8,949,568 B2 | 2/2015 | Wei et al. |
| 8,977,781 B1 | 3/2015 | Yokoi et al. |
| 8,996,468 B1 | 3/2015 | Mattox |
| 8,996,535 B1 | 3/2015 | Kimmel et al. |
| 8,996,790 B1 | 3/2015 | Segal et al. |
| 8,996,797 B1 | 3/2015 | Zheng et al. |
| 9,003,162 B2 | 4/2015 | Lomet et al. |
| 9,009,449 B2 | 4/2015 | Chou et al. |
| 9,021,303 B1 | 4/2015 | Desouter et al. |
| 9,026,694 B1 | 5/2015 | Davidson et al. |
| 9,037,544 B1 | 5/2015 | Zheng et al. |
| 9,047,211 B2 | 6/2015 | Wood et al. |
| 9,058,119 B1 | 6/2015 | Ray, III et al. |
| 9,092,142 B2 | 7/2015 | Nashimoto et al. |
| 9,152,684 B2 | 10/2015 | Zheng et al. |
| 9,170,746 B2 | 10/2015 | Sundaram et al. |
| 9,195,939 B1 | 11/2015 | Goyal et al. |
| 9,201,742 B2 | 12/2015 | Bulkowski et al. |
| 9,201,804 B1 | 12/2015 | Egyed |
| 9,225,801 B1 | 12/2015 | McMullen et al. |
| 9,229,642 B2 | 1/2016 | Shu et al. |
| 9,256,549 B2 | 2/2016 | Kimmel et al. |
| 9,268,502 B2 | 2/2016 | Zheng et al. |
| 9,274,901 B2 | 3/2016 | Veerla et al. |
| 9,286,413 B1 | 3/2016 | Coates et al. |
| 9,298,417 B1 | 3/2016 | Muddu et al. |
| 9,367,241 B2 | 6/2016 | Sundaram et al. |
| 9,378,043 B1 | 6/2016 | Zhang et al. |
| 9,389,958 B2 | 7/2016 | Sundaram et al. |
| 9,405,783 B2 | 8/2016 | Kimmel et al. |
| 9,411,620 B2 | 8/2016 | Wang et al. |
| 9,413,680 B1 | 8/2016 | Kusters et al. |
| 9,418,131 B1 | 8/2016 | Halevi et al. |
| 9,438,665 B1 * | 9/2016 | Vasanth ............... H04L 67/10 |
| 9,459,856 B2 | 10/2016 | Curzi et al. |
| 9,460,009 B1 | 10/2016 | Taylor et al. |
| 9,471,680 B2 | 10/2016 | Elsner et al. |
| 9,483,349 B2 | 11/2016 | Sundaram et al. |
| 9,537,827 B1 | 1/2017 | McMullen et al. |
| 9,572,091 B2 | 2/2017 | Lee et al. |
| 9,606,874 B2 | 3/2017 | Moore et al. |
| 9,639,293 B2 | 5/2017 | Guo et al. |
| 9,639,546 B1 | 5/2017 | Gorski et al. |
| 9,652,405 B1 | 5/2017 | Shain et al. |
| 9,690,703 B1 | 6/2017 | Jess et al. |
| 9,779,123 B2 | 10/2017 | Sen et al. |
| 9,785,525 B2 | 10/2017 | Watanabe et al. |
| 9,798,497 B1 | 10/2017 | Schick et al. |
| 9,817,858 B2 | 11/2017 | Eisenreich et al. |
| 9,846,642 B2 | 12/2017 | Choi et al. |
| 9,852,076 B1 | 12/2017 | Garg et al. |
| 9,953,351 B1 | 4/2018 | Sivasubramanian et al. |
| 9,954,946 B2 | 4/2018 | Shetty et al. |
| 10,216,966 B2 | 2/2019 | McClanahan et al. |
| 10,516,582 B2 | 12/2019 | Wright et al. |
| 10,565,230 B2 | 2/2020 | Zheng et al. |
| 10,642,763 B2 | 5/2020 | Longo et al. |
| 10,997,098 B2 | 5/2021 | Longo et al. |
| 2001/0056543 A1 | 12/2001 | Isomura et al. |

(56) References Cited

U.S. PATENT DOCUMENTS

| | | |
|---|---|---|
| 2002/0073354 A1 | 6/2002 | Schroiff et al. |
| 2002/0091897 A1 | 7/2002 | Chiu et al. |
| 2002/0116569 A1 | 8/2002 | Kim et al. |
| 2002/0156891 A1 | 10/2002 | Ulrich et al. |
| 2002/0158898 A1 | 10/2002 | Hsieh et al. |
| 2002/0174419 A1 | 11/2002 | Alvarez et al. |
| 2002/0175938 A1 | 11/2002 | Hackworth |
| 2002/0188711 A1 | 12/2002 | Meyer et al. |
| 2003/0005147 A1 | 1/2003 | Enns et al. |
| 2003/0084251 A1 | 5/2003 | Gaither et al. |
| 2003/0105928 A1 | 6/2003 | Ash et al. |
| 2003/0115204 A1 | 6/2003 | Greenblatt et al. |
| 2003/0115282 A1 | 6/2003 | Rose |
| 2003/0120869 A1 | 6/2003 | Lee et al. |
| 2003/0126118 A1 | 7/2003 | Burton et al. |
| 2003/0126143 A1 | 7/2003 | Roussopoulos et al. |
| 2003/0135729 A1 | 7/2003 | Mason et al. |
| 2003/0145041 A1 | 7/2003 | Dunham et al. |
| 2003/0159007 A1 | 8/2003 | Sawdon et al. |
| 2003/0163628 A1 | 8/2003 | Lin et al. |
| 2003/0172059 A1 | 9/2003 | Andrei |
| 2003/0182312 A1 | 9/2003 | Chen et al. |
| 2003/0182322 A1 | 9/2003 | Manley et al. |
| 2003/0191916 A1 | 10/2003 | McBrearty et al. |
| 2003/0195895 A1 | 10/2003 | Nowicki et al. |
| 2003/0200388 A1 | 10/2003 | Hetrick |
| 2003/0212872 A1 | 11/2003 | Patterson et al. |
| 2003/0223445 A1 | 12/2003 | Lodha |
| 2004/0003173 A1 | 1/2004 | Yao et al. |
| 2004/0052254 A1 | 3/2004 | Hooper |
| 2004/0054656 A1 | 3/2004 | Leung et al. |
| 2004/0107281 A1 | 6/2004 | Bose et al. |
| 2004/0133590 A1 | 7/2004 | Henderson et al. |
| 2004/0133622 A1 | 7/2004 | Clubb et al. |
| 2004/0133742 A1 | 7/2004 | Vasudevan et al. |
| 2004/0153544 A1 | 8/2004 | Kelliher et al. |
| 2004/0153863 A1 | 8/2004 | Klotz et al. |
| 2004/0158549 A1 | 8/2004 | Matena et al. |
| 2004/0186858 A1 | 9/2004 | McGovern et al. |
| 2004/0205166 A1 | 10/2004 | Demoney |
| 2004/0210794 A1 | 10/2004 | Frey et al. |
| 2004/0215792 A1 | 10/2004 | Koning et al. |
| 2004/0267836 A1 | 12/2004 | Armangau et al. |
| 2004/0267932 A1 | 12/2004 | Voellm et al. |
| 2005/0010653 A1 | 1/2005 | McCanne |
| 2005/0027817 A1 | 2/2005 | Novik et al. |
| 2005/0039156 A1 | 2/2005 | Catthoor et al. |
| 2005/0043834 A1 | 2/2005 | Rotariu et al. |
| 2005/0044244 A1 | 2/2005 | Warwick et al. |
| 2005/0076113 A1 | 4/2005 | Klotz et al. |
| 2005/0076115 A1 | 4/2005 | Andrews et al. |
| 2005/0080923 A1 | 4/2005 | Elzur |
| 2005/0091261 A1 | 4/2005 | Wu et al. |
| 2005/0108472 A1 | 5/2005 | Kanai et al. |
| 2005/0119996 A1 | 6/2005 | Ohata et al. |
| 2005/0128951 A1 | 6/2005 | Chawla et al. |
| 2005/0138285 A1* | 6/2005 | Takaoka ............ G06F 3/0665 711/114 |
| 2005/0144514 A1 | 6/2005 | Ulrich et al. |
| 2005/0177770 A1 | 8/2005 | Coatney et al. |
| 2005/0203930 A1 | 9/2005 | Bukowski et al. |
| 2005/0216503 A1 | 9/2005 | Charlot et al. |
| 2005/0228885 A1 | 10/2005 | Winfield et al. |
| 2005/0246362 A1 | 11/2005 | Borland |
| 2005/0246398 A1 | 11/2005 | Barzilai et al. |
| 2006/0004957 A1 | 1/2006 | Hand et al. |
| 2006/0071845 A1 | 4/2006 | Stroili et al. |
| 2006/0072555 A1 | 4/2006 | St. et al. |
| 2006/0072593 A1 | 4/2006 | Grippo et al. |
| 2006/0074977 A1 | 4/2006 | Kothuri et al. |
| 2006/0075467 A1 | 4/2006 | Sanda et al. |
| 2006/0085166 A1 | 4/2006 | Ochi et al. |
| 2006/0101091 A1 | 5/2006 | Carbajales et al. |
| 2006/0101202 A1 | 5/2006 | Mannen et al. |
| 2006/0112155 A1 | 5/2006 | Earl et al. |
| 2006/0129676 A1 | 6/2006 | Modi et al. |
| 2006/0136718 A1 | 6/2006 | Moreillon |
| 2006/0156059 A1 | 7/2006 | Kitamura |
| 2006/0165074 A1 | 7/2006 | Modi et al. |
| 2006/0206671 A1 | 9/2006 | Aiello et al. |
| 2006/0232826 A1 | 10/2006 | Bar-El |
| 2006/0253749 A1 | 11/2006 | Alderegula et al. |
| 2006/0282662 A1 | 12/2006 | Whitcomb |
| 2006/0288151 A1 | 12/2006 | McKenney |
| 2007/0016617 A1 | 1/2007 | Lomet |
| 2007/0033376 A1 | 2/2007 | Sinclair et al. |
| 2007/0033433 A1 | 2/2007 | Pecone et al. |
| 2007/0061572 A1 | 3/2007 | Imai et al. |
| 2007/0064604 A1 | 3/2007 | Chen et al. |
| 2007/0083482 A1 | 4/2007 | Rathi et al. |
| 2007/0083722 A1 | 4/2007 | Per et al. |
| 2007/0088702 A1 | 4/2007 | Fridella et al. |
| 2007/0094452 A1 | 4/2007 | Fachan |
| 2007/0106706 A1 | 5/2007 | Ahrens et al. |
| 2007/0109592 A1 | 5/2007 | Parvathaneni et al. |
| 2007/0112723 A1 | 5/2007 | Alvarez et al. |
| 2007/0112955 A1 | 5/2007 | Clemm et al. |
| 2007/0136269 A1 | 6/2007 | Yamakabe et al. |
| 2007/0143359 A1 | 6/2007 | Uppala et al. |
| 2007/0186066 A1 | 8/2007 | Desai et al. |
| 2007/0186127 A1 | 8/2007 | Desai et al. |
| 2007/0208537 A1 | 9/2007 | Savoor et al. |
| 2007/0208918 A1 | 9/2007 | Harbin et al. |
| 2007/0234106 A1 | 10/2007 | Lecrone et al. |
| 2007/0245041 A1 | 10/2007 | Hua et al. |
| 2007/0255530 A1 | 11/2007 | Wolff |
| 2007/0266037 A1 | 11/2007 | Terry et al. |
| 2007/0300013 A1 | 12/2007 | Kitamura |
| 2008/0019359 A1 | 1/2008 | Droux et al. |
| 2008/0065639 A1 | 3/2008 | Choudhary et al. |
| 2008/0071939 A1 | 3/2008 | Tanaka et al. |
| 2008/0104264 A1 | 5/2008 | Duerk et al. |
| 2008/0126695 A1 | 5/2008 | Berg |
| 2008/0127211 A1 | 5/2008 | Belsey et al. |
| 2008/0155190 A1 | 6/2008 | Ash et al. |
| 2008/0162079 A1 | 7/2008 | Astigarraga et al. |
| 2008/0162990 A1 | 7/2008 | Wang et al. |
| 2008/0165899 A1 | 7/2008 | Rahman et al. |
| 2008/0168226 A1 | 7/2008 | Wang et al. |
| 2008/0184063 A1 | 7/2008 | Abdulvahid |
| 2008/0201535 A1 | 8/2008 | Hara |
| 2008/0212938 A1 | 9/2008 | Sato et al. |
| 2008/0228691 A1 | 9/2008 | Shavit et al. |
| 2008/0244158 A1 | 10/2008 | Funatsu et al. |
| 2008/0244354 A1 | 10/2008 | Wu et al. |
| 2008/0250270 A1 | 10/2008 | Bennett |
| 2008/0270719 A1 | 10/2008 | Cochran et al. |
| 2009/0019449 A1 | 1/2009 | Choi et al. |
| 2009/0031083 A1 | 1/2009 | Willis et al. |
| 2009/0037500 A1 | 2/2009 | Kirshenbaum |
| 2009/0037654 A1 | 2/2009 | Allison et al. |
| 2009/0043878 A1 | 2/2009 | Ni |
| 2009/0083478 A1 | 3/2009 | Kunimatsu et al. |
| 2009/0097654 A1 | 4/2009 | Blake |
| 2009/0132770 A1 | 5/2009 | Lin et al. |
| 2009/0144497 A1 | 6/2009 | Withers |
| 2009/0150537 A1 | 6/2009 | Fanson |
| 2009/0157870 A1 | 6/2009 | Nakadai |
| 2009/0193206 A1 | 7/2009 | Ishii et al. |
| 2009/0204636 A1 | 8/2009 | Li et al. |
| 2009/0210611 A1 | 8/2009 | Mizushima |
| 2009/0210618 A1 | 8/2009 | Bates et al. |
| 2009/0225657 A1 | 9/2009 | Haggar et al. |
| 2009/0235022 A1 | 9/2009 | Bates et al. |
| 2009/0235110 A1 | 9/2009 | Kurokawa et al. |
| 2009/0249001 A1 | 10/2009 | Narayanan et al. |
| 2009/0249019 A1 | 10/2009 | Wu et al. |
| 2009/0271412 A1 | 10/2009 | Lacapra et al. |
| 2009/0276567 A1 | 11/2009 | Burkey |
| 2009/0276771 A1 | 11/2009 | Nickolov et al. |
| 2009/0285476 A1 | 11/2009 | Choe et al. |
| 2009/0299940 A1 | 12/2009 | Hayes et al. |
| 2009/0307290 A1 | 12/2009 | Barsness et al. |
| 2009/0313451 A1 | 12/2009 | Inoue et al. |

(56) References Cited

U.S. PATENT DOCUMENTS

| | | |
|---|---|---|
| 2009/0313503 A1 | 12/2009 | Atluri et al. |
| 2009/0327604 A1 | 12/2009 | Sato et al. |
| 2010/0011037 A1 | 1/2010 | Kazar |
| 2010/0023726 A1 | 1/2010 | Aviles |
| 2010/0030981 A1 | 2/2010 | Cook |
| 2010/0031000 A1 | 2/2010 | Flynn et al. |
| 2010/0031315 A1 | 2/2010 | Feng |
| 2010/0042790 A1 | 2/2010 | Mondal et al. |
| 2010/0057792 A1 | 3/2010 | Ylonen |
| 2010/0070701 A1 | 3/2010 | Iyigun et al. |
| 2010/0077101 A1 | 3/2010 | Wang et al. |
| 2010/0077380 A1 | 3/2010 | Baker et al. |
| 2010/0082648 A1 | 4/2010 | Potapov et al. |
| 2010/0082790 A1 | 4/2010 | Hussaini et al. |
| 2010/0122148 A1 | 5/2010 | Flynn et al. |
| 2010/0124196 A1 | 5/2010 | Bonar et al. |
| 2010/0161569 A1 | 6/2010 | Schreter |
| 2010/0161574 A1 | 6/2010 | Davidson et al. |
| 2010/0161850 A1 | 6/2010 | Otsuka |
| 2010/0169415 A1 | 7/2010 | Leggette et al. |
| 2010/0174677 A1 | 7/2010 | Zahavi et al. |
| 2010/0174714 A1 | 7/2010 | Asmundsson et al. |
| 2010/0191713 A1 | 7/2010 | Lomet et al. |
| 2010/0199009 A1 | 8/2010 | Koide |
| 2010/0199040 A1 | 8/2010 | Schnapp et al. |
| 2010/0205353 A1 | 8/2010 | Miyamoto et al. |
| 2010/0205390 A1 | 8/2010 | Arakawa |
| 2010/0217953 A1 | 8/2010 | Beaman et al. |
| 2010/0223385 A1 | 9/2010 | Gulley et al. |
| 2010/0228795 A1 | 9/2010 | Hahn et al. |
| 2010/0228999 A1 | 9/2010 | Maheshwari et al. |
| 2010/0250497 A1 | 9/2010 | Redlich et al. |
| 2010/0250712 A1 | 9/2010 | Ellison et al. |
| 2010/0262812 A1 | 10/2010 | Lopez et al. |
| 2010/0268983 A1 | 10/2010 | Raghunandan |
| 2010/0269044 A1 | 10/2010 | Ivanyi et al. |
| 2010/0280998 A1 | 11/2010 | Goebel et al. |
| 2010/0281080 A1 | 11/2010 | Rajaram et al. |
| 2010/0293147 A1 | 11/2010 | Snow et al. |
| 2010/0306468 A1 | 12/2010 | Shionoya |
| 2010/0309933 A1 | 12/2010 | Stark et al. |
| 2011/0004707 A1 | 1/2011 | Spry et al. |
| 2011/0022778 A1 | 1/2011 | Schibilla et al. |
| 2011/0035548 A1 | 2/2011 | Kimmel et al. |
| 2011/0066808 A1 | 3/2011 | Flynn et al. |
| 2011/0072008 A1 | 3/2011 | Mandal et al. |
| 2011/0078496 A1 | 3/2011 | Jeddeloh |
| 2011/0087929 A1 | 4/2011 | Koshiyama |
| 2011/0093674 A1 | 4/2011 | Frame et al. |
| 2011/0099342 A1 | 4/2011 | Ozdemir et al. |
| 2011/0099419 A1 | 4/2011 | Lucas et al. |
| 2011/0119412 A1 | 5/2011 | Orfitelli |
| 2011/0119668 A1 | 5/2011 | Calder et al. |
| 2011/0126045 A1 | 5/2011 | Bennett et al. |
| 2011/0153603 A1 | 6/2011 | Adiba et al. |
| 2011/0153719 A1 | 6/2011 | Santoro et al. |
| 2011/0153972 A1 | 6/2011 | Laberge |
| 2011/0154103 A1 | 6/2011 | Bulusu et al. |
| 2011/0161293 A1 | 6/2011 | Vermeulen et al. |
| 2011/0161725 A1 | 6/2011 | Allen et al. |
| 2011/0173401 A1 | 7/2011 | Usgaonkar et al. |
| 2011/0191389 A1 | 8/2011 | Okamoto |
| 2011/0191522 A1 | 8/2011 | Condict et al. |
| 2011/0196842 A1 | 8/2011 | Timashev et al. |
| 2011/0202516 A1 | 8/2011 | Rugg et al. |
| 2011/0213928 A1 | 9/2011 | Grube et al. |
| 2011/0219106 A1 | 9/2011 | Wright |
| 2011/0231624 A1 | 9/2011 | Fukutomi et al. |
| 2011/0238857 A1 | 9/2011 | Certain et al. |
| 2011/0246733 A1 | 10/2011 | Usgaonkar et al. |
| 2011/0246821 A1 | 10/2011 | Eleftheriou et al. |
| 2011/0283048 A1 | 11/2011 | Feldman et al. |
| 2011/0286123 A1 | 11/2011 | Montgomery et al. |
| 2011/0289565 A1 | 11/2011 | Resch et al. |
| 2011/0296133 A1 | 12/2011 | Flynn et al. |
| 2011/0302572 A1 | 12/2011 | Kuncoro et al. |
| 2011/0307530 A1 | 12/2011 | Patterson |
| 2011/0311051 A1 | 12/2011 | Resch et al. |
| 2011/0314346 A1 | 12/2011 | Vas et al. |
| 2012/0003940 A1 | 1/2012 | Hirano et al. |
| 2012/0011176 A1 | 1/2012 | Aizman |
| 2012/0011340 A1 | 1/2012 | Flynn et al. |
| 2012/0016840 A1 | 1/2012 | Lin et al. |
| 2012/0047115 A1 | 2/2012 | Subramanya et al. |
| 2012/0054746 A1 | 3/2012 | Vaghani et al. |
| 2012/0063306 A1 | 3/2012 | Sultan et al. |
| 2012/0066204 A1 | 3/2012 | Ball et al. |
| 2012/0072656 A1 | 3/2012 | Archak et al. |
| 2012/0072680 A1 | 3/2012 | Kimura et al. |
| 2012/0078856 A1 | 3/2012 | Linde |
| 2012/0084506 A1 | 4/2012 | Colgrove et al. |
| 2012/0109895 A1 | 5/2012 | Zwilling et al. |
| 2012/0109936 A1 | 5/2012 | Zhang et al. |
| 2012/0124282 A1 | 5/2012 | Frank et al. |
| 2012/0136834 A1 | 5/2012 | Zhao |
| 2012/0143877 A1 | 6/2012 | Kumar et al. |
| 2012/0150869 A1 | 6/2012 | Wang et al. |
| 2012/0150930 A1 | 6/2012 | Jin et al. |
| 2012/0151118 A1 | 6/2012 | Flynn et al. |
| 2012/0166715 A1 | 6/2012 | Frost et al. |
| 2012/0166749 A1 | 6/2012 | Eleftheriou et al. |
| 2012/0185437 A1 | 7/2012 | Pavlov et al. |
| 2012/0197844 A1 | 8/2012 | Wang et al. |
| 2012/0210095 A1 | 8/2012 | Nellans et al. |
| 2012/0226668 A1 | 9/2012 | Dhamankar et al. |
| 2012/0226841 A1 | 9/2012 | Nguyen et al. |
| 2012/0239869 A1 | 9/2012 | Chiueh et al. |
| 2012/0240126 A1 | 9/2012 | Dice et al. |
| 2012/0243687 A1 | 9/2012 | Li et al. |
| 2012/0246129 A1 | 9/2012 | Rothschild et al. |
| 2012/0246392 A1 | 9/2012 | Cheon |
| 2012/0271868 A1 | 10/2012 | Fukatani et al. |
| 2012/0290629 A1 | 11/2012 | Beaverson et al. |
| 2012/0290788 A1 | 11/2012 | Klemm et al. |
| 2012/0303876 A1 | 11/2012 | Benhase et al. |
| 2012/0310890 A1 | 12/2012 | Dodd et al. |
| 2012/0311246 A1 | 12/2012 | McWilliams et al. |
| 2012/0311290 A1 | 12/2012 | White |
| 2012/0311292 A1 | 12/2012 | Maniwa et al. |
| 2012/0311568 A1 | 12/2012 | Jansen |
| 2012/0317084 A1 | 12/2012 | Liu |
| 2012/0317338 A1 | 12/2012 | Yi et al. |
| 2012/0317353 A1 | 12/2012 | Webman et al. |
| 2012/0317395 A1 | 12/2012 | Segev et al. |
| 2012/0323860 A1 | 12/2012 | Yasa et al. |
| 2012/0324150 A1 | 12/2012 | Moshayedi et al. |
| 2012/0331471 A1 | 12/2012 | Ramalingam et al. |
| 2013/0007097 A1 | 1/2013 | Sambe et al. |
| 2013/0007370 A1 | 1/2013 | Parikh et al. |
| 2013/0010966 A1 | 1/2013 | Li et al. |
| 2013/0013654 A1 | 1/2013 | Lacapra et al. |
| 2013/0018722 A1 | 1/2013 | Libby |
| 2013/0018854 A1 | 1/2013 | Condict |
| 2013/0019057 A1 | 1/2013 | Stephens et al. |
| 2013/0024641 A1 | 1/2013 | Talagala et al. |
| 2013/0042065 A1 | 2/2013 | Kasten et al. |
| 2013/0054927 A1 | 2/2013 | Raj et al. |
| 2013/0055358 A1 | 2/2013 | Short et al. |
| 2013/0060992 A1 | 3/2013 | Cho et al. |
| 2013/0061169 A1 | 3/2013 | Pearcy et al. |
| 2013/0073519 A1 | 3/2013 | Lewis et al. |
| 2013/0073821 A1 | 3/2013 | Flynn et al. |
| 2013/0080679 A1 | 3/2013 | Bert |
| 2013/0080720 A1 | 3/2013 | Nakamura et al. |
| 2013/0083639 A1 | 4/2013 | Wharton et al. |
| 2013/0086006 A1 | 4/2013 | Colgrove et al. |
| 2013/0086270 A1 | 4/2013 | Nishikawa et al. |
| 2013/0086336 A1 | 4/2013 | Canepa et al. |
| 2013/0097341 A1* | 4/2013 | Oe .................. G06F 3/0611 710/15 |
| 2013/0110783 A1 | 5/2013 | Wertheimer et al. |
| 2013/0110845 A1 | 5/2013 | Dua |
| 2013/0111374 A1 | 5/2013 | Hamilton et al. |
| 2013/0124776 A1 | 5/2013 | Hallak et al. |

(56) References Cited

U.S. PATENT DOCUMENTS

| | | |
|---|---|---|
| 2013/0138616 A1 | 5/2013 | Gupta et al. |
| 2013/0138862 A1 | 5/2013 | Motwani et al. |
| 2013/0148504 A1 | 6/2013 | Ungureanu |
| 2013/0159512 A1 | 6/2013 | Groves et al. |
| 2013/0159815 A1 | 6/2013 | Jung et al. |
| 2013/0166724 A1 | 6/2013 | Bairavasundaram et al. |
| 2013/0166727 A1 | 6/2013 | Wright et al. |
| 2013/0166861 A1 | 6/2013 | Takano et al. |
| 2013/0185403 A1 | 7/2013 | Vachharajani et al. |
| 2013/0185719 A1 | 7/2013 | Kar et al. |
| 2013/0198480 A1 | 8/2013 | Jones et al. |
| 2013/0204902 A1 | 8/2013 | Wang et al. |
| 2013/0219048 A1 | 8/2013 | Arvidsson et al. |
| 2013/0219214 A1 | 8/2013 | Samanta et al. |
| 2013/0226877 A1 | 8/2013 | Nagai et al. |
| 2013/0227111 A1* | 8/2013 | Wright ............... G06F 11/3495 709/223 |
| 2013/0227145 A1 | 8/2013 | Wright et al. |
| 2013/0227195 A1 | 8/2013 | Beaverson et al. |
| 2013/0227201 A1 | 8/2013 | Talagala et al. |
| 2013/0227236 A1 | 8/2013 | Flynn et al. |
| 2013/0232240 A1 | 9/2013 | Purusothaman et al. |
| 2013/0232261 A1 | 9/2013 | Wright et al. |
| 2013/0238832 A1 | 9/2013 | Dronamraju et al. |
| 2013/0238876 A1 | 9/2013 | Fiske et al. |
| 2013/0238932 A1 | 9/2013 | Resch |
| 2013/0262404 A1 | 10/2013 | Daga et al. |
| 2013/0262412 A1 | 10/2013 | Hawton et al. |
| 2013/0262746 A1 | 10/2013 | Srinivasan |
| 2013/0262762 A1 | 10/2013 | Igashira et al. |
| 2013/0262805 A1 | 10/2013 | Zheng et al. |
| 2013/0268497 A1 | 10/2013 | Baldwin et al. |
| 2013/0275656 A1 | 10/2013 | Talagala et al. |
| 2013/0290249 A1 | 10/2013 | Merriman et al. |
| 2013/0290263 A1 | 10/2013 | Beaverson et al. |
| 2013/0298170 A1 | 11/2013 | Elarabawy et al. |
| 2013/0304998 A1 | 11/2013 | Palmer et al. |
| 2013/0305002 A1 | 11/2013 | Hallak et al. |
| 2013/0311740 A1 | 11/2013 | Watanabe et al. |
| 2013/0325828 A1 | 12/2013 | Larson et al. |
| 2013/0326546 A1 | 12/2013 | Bavishi et al. |
| 2013/0339629 A1 | 12/2013 | Alexander et al. |
| 2013/0346700 A1 | 12/2013 | Tomlinson et al. |
| 2013/0346720 A1 | 12/2013 | Colgrove et al. |
| 2013/0346810 A1 | 12/2013 | Kimmel et al. |
| 2014/0006353 A1 | 1/2014 | Chen et al. |
| 2014/0013068 A1 | 1/2014 | Yamato et al. |
| 2014/0025986 A1 | 1/2014 | Kalyanaraman et al. |
| 2014/0052764 A1 | 2/2014 | Michael et al. |
| 2014/0059309 A1 | 2/2014 | Brown et al. |
| 2014/0068184 A1 | 3/2014 | Edwards et al. |
| 2014/0081906 A1 | 3/2014 | Geddam et al. |
| 2014/0081918 A1 | 3/2014 | Srivas et al. |
| 2014/0082255 A1 | 3/2014 | Powell |
| 2014/0082273 A1 | 3/2014 | Segev |
| 2014/0089264 A1 | 3/2014 | Talagala et al. |
| 2014/0089683 A1 | 3/2014 | Miller et al. |
| 2014/0095758 A1 | 4/2014 | Smith et al. |
| 2014/0095803 A1 | 4/2014 | Kim et al. |
| 2014/0101115 A1 | 4/2014 | Ko et al. |
| 2014/0101298 A1 | 4/2014 | Shukla et al. |
| 2014/0108350 A1 | 4/2014 | Marsden |
| 2014/0108797 A1 | 4/2014 | Johnson et al. |
| 2014/0108863 A1 | 4/2014 | Nowoczynski et al. |
| 2014/0129830 A1 | 5/2014 | Raudaschl |
| 2014/0143207 A1 | 5/2014 | Brewer et al. |
| 2014/0143213 A1 | 5/2014 | Tal et al. |
| 2014/0149355 A1 | 5/2014 | Gupta et al. |
| 2014/0149647 A1 | 5/2014 | Guo et al. |
| 2014/0164715 A1 | 6/2014 | Weiner et al. |
| 2014/0172811 A1 | 6/2014 | Green |
| 2014/0181370 A1 | 6/2014 | Cohen et al. |
| 2014/0185615 A1 | 7/2014 | Ayoub et al. |
| 2014/0195199 A1 | 7/2014 | Uluyol |
| 2014/0195480 A1 | 7/2014 | Talagala et al. |
| 2014/0195492 A1 | 7/2014 | Wilding et al. |
| 2014/0195564 A1 | 7/2014 | Talagala et al. |
| 2014/0208003 A1 | 7/2014 | Cohen et al. |
| 2014/0215129 A1 | 7/2014 | Kuzmin et al. |
| 2014/0215147 A1 | 7/2014 | Pan |
| 2014/0215170 A1 | 7/2014 | Scarping et al. |
| 2014/0215262 A1 | 7/2014 | Li et al. |
| 2014/0223029 A1 | 8/2014 | Bhaskar et al. |
| 2014/0223089 A1 | 8/2014 | Kang et al. |
| 2014/0244962 A1 | 8/2014 | Arges et al. |
| 2014/0250440 A1 | 9/2014 | Carter et al. |
| 2014/0258681 A1 | 9/2014 | Prasky et al. |
| 2014/0259000 A1 | 9/2014 | Desanti et al. |
| 2014/0279917 A1 | 9/2014 | Minh et al. |
| 2014/0279931 A1 | 9/2014 | Gupta et al. |
| 2014/0281017 A1 | 9/2014 | Apte |
| 2014/0281055 A1 | 9/2014 | Davda et al. |
| 2014/0281123 A1 | 9/2014 | Weber |
| 2014/0281131 A1 | 9/2014 | Joshi et al. |
| 2014/0283118 A1 | 9/2014 | Anderson et al. |
| 2014/0289476 A1 | 9/2014 | Nayak |
| 2014/0297980 A1 | 10/2014 | Yamazaki |
| 2014/0304548 A1 | 10/2014 | Steffan et al. |
| 2014/0310231 A1 | 10/2014 | Sampathkumaran et al. |
| 2014/0310373 A1 | 10/2014 | Aviles et al. |
| 2014/0317093 A1 | 10/2014 | Sun et al. |
| 2014/0325117 A1 | 10/2014 | Canepa et al. |
| 2014/0325147 A1 | 10/2014 | Nayak |
| 2014/0344216 A1 | 11/2014 | Abercrombie et al. |
| 2014/0344222 A1 | 11/2014 | Morris et al. |
| 2014/0344539 A1 | 11/2014 | Gordon et al. |
| 2014/0372384 A1 | 12/2014 | Long et al. |
| 2014/0379965 A1 | 12/2014 | Gole et al. |
| 2014/0379990 A1 | 12/2014 | Pan et al. |
| 2014/0379991 A1 | 12/2014 | Lomet et al. |
| 2014/0380092 A1 | 12/2014 | Kim et al. |
| 2015/0019792 A1 | 1/2015 | Swanson et al. |
| 2015/0032928 A1 | 1/2015 | Andrews et al. |
| 2015/0039716 A1* | 2/2015 | Przykucki, Jr. ..... H04L 67/1097 709/214 |
| 2015/0039745 A1 | 2/2015 | Degioanni et al. |
| 2015/0039852 A1 | 2/2015 | Sen et al. |
| 2015/0040052 A1 | 2/2015 | Noel et al. |
| 2015/0052315 A1 | 2/2015 | Ghai et al. |
| 2015/0058577 A1 | 2/2015 | Earl |
| 2015/0066852 A1 | 3/2015 | Beard et al. |
| 2015/0085665 A1 | 3/2015 | Kompella et al. |
| 2015/0085695 A1 | 3/2015 | Ryckbosch et al. |
| 2015/0089138 A1 | 3/2015 | Tao et al. |
| 2015/0089285 A1 | 3/2015 | Lim et al. |
| 2015/0095555 A1 | 4/2015 | Asnaashari et al. |
| 2015/0106556 A1 | 4/2015 | Yu et al. |
| 2015/0112939 A1 | 4/2015 | Cantwell et al. |
| 2015/0120754 A1 | 4/2015 | Chase et al. |
| 2015/0121021 A1 | 4/2015 | Nakamura et al. |
| 2015/0127922 A1 | 5/2015 | Camp et al. |
| 2015/0134926 A1 | 5/2015 | Yang et al. |
| 2015/0169414 A1 | 6/2015 | Lalsangi et al. |
| 2015/0172111 A1 | 6/2015 | Lalsangi et al. |
| 2015/0186270 A1 | 7/2015 | Peng et al. |
| 2015/0193338 A1 | 7/2015 | Sundaram et al. |
| 2015/0199415 A1 | 7/2015 | Bourbonnais et al. |
| 2015/0213032 A1 | 7/2015 | Powell et al. |
| 2015/0220402 A1 | 8/2015 | Cantwell et al. |
| 2015/0234709 A1 | 8/2015 | Koarashi |
| 2015/0236926 A1 | 8/2015 | Wright et al. |
| 2015/0242478 A1 | 8/2015 | Cantwell et al. |
| 2015/0244795 A1 | 8/2015 | Cantwell et al. |
| 2015/0253992 A1 | 9/2015 | Ishiguro et al. |
| 2015/0254013 A1 | 9/2015 | Chun |
| 2015/0261446 A1 | 9/2015 | Lee |
| 2015/0261792 A1 | 9/2015 | Attarde et al. |
| 2015/0269201 A1 | 9/2015 | Caso et al. |
| 2015/0286438 A1 | 10/2015 | Simionescu et al. |
| 2015/0288671 A1 | 10/2015 | Chan et al. |
| 2015/0293817 A1 | 10/2015 | Subramanian et al. |
| 2015/0301964 A1 | 10/2015 | Brinicombe et al. |
| 2015/0324236 A1 | 11/2015 | Gopalan et al. |
| 2015/0324264 A1 | 11/2015 | Chinnakkonda et al. |

(56) References Cited

U.S. PATENT DOCUMENTS

| | | | |
|---|---|---|---|
| 2015/0339194 A1 | 11/2015 | Kalos et al. |
| 2015/0355985 A1 | 12/2015 | Holtz et al. |
| 2015/0363328 A1 | 12/2015 | Candelaria |
| 2015/0370715 A1 | 12/2015 | Samanta et al. |
| 2015/0378613 A1 | 12/2015 | Koseki |
| 2016/0004733 A1 | 1/2016 | Cao et al. |
| 2016/0011984 A1 | 1/2016 | Speer et al. |
| 2016/0026552 A1 | 1/2016 | Holden et al. |
| 2016/0034358 A1 | 2/2016 | Hayasaka et al. |
| 2016/0034550 A1 | 2/2016 | Ostler et al. |
| 2016/0048342 A1 | 2/2016 | Jia et al. |
| 2016/0070480 A1 | 3/2016 | Babu et al. |
| 2016/0070490 A1 | 3/2016 | Koarashi et al. |
| 2016/0070618 A1 | 3/2016 | Pundir et al. |
| 2016/0070644 A1 | 3/2016 | D'Sa et al. |
| 2016/0070714 A1 | 3/2016 | D'Sa et al. |
| 2016/0077744 A1 | 3/2016 | Pundir et al. |
| 2016/0092125 A1 | 3/2016 | Cowling et al. |
| 2016/0099844 A1 | 4/2016 | Colgrove et al. |
| 2016/0139838 A1 | 5/2016 | D'Sa et al. |
| 2016/0139849 A1 | 5/2016 | Chaw et al. |
| 2016/0149763 A1 | 5/2016 | Ingram et al. |
| 2016/0149766 A1 | 5/2016 | Borowiec et al. |
| 2016/0154834 A1 | 6/2016 | Friedman et al. |
| 2016/0179410 A1 | 6/2016 | Haas et al. |
| 2016/0188370 A1 | 6/2016 | Razin et al. |
| 2016/0188430 A1 | 6/2016 | Nitta et al. |
| 2016/0203043 A1 | 7/2016 | Nazari et al. |
| 2016/0283139 A1 | 9/2016 | Brooker et al. |
| 2016/0350192 A1 | 12/2016 | Doherty et al. |
| 2016/0371021 A1 | 12/2016 | Goldberg et al. |
| 2017/0003892 A1 | 1/2017 | Sekido et al. |
| 2017/0017413 A1 | 1/2017 | Aston et al. |
| 2017/0031769 A1 | 2/2017 | Zheng et al. |
| 2017/0031774 A1 | 2/2017 | Bolen et al. |
| 2017/0046257 A1 | 2/2017 | Babu et al. |
| 2017/0068599 A1 | 3/2017 | Chiu et al. |
| 2017/0083535 A1 | 3/2017 | Marchukov et al. |
| 2017/0097873 A1 | 4/2017 | Krishnamachari et al. |
| 2017/0109298 A1 | 4/2017 | Kurita et al. |
| 2017/0123726 A1 | 5/2017 | Sinclair et al. |
| 2017/0212690 A1 | 7/2017 | Babu et al. |
| 2017/0220777 A1 | 8/2017 | Wang et al. |
| 2017/0300248 A1 | 10/2017 | Purohit et al. |
| 2017/0351543 A1 | 12/2017 | Kimura |
| 2018/0287951 A1 | 10/2018 | Waskiewicz, Jr. et al. |

FOREIGN PATENT DOCUMENTS

| | | |
|---|---|---|
| EP | 2693358 A1 | 2/2014 |
| EP | 2735978 A1 | 5/2014 |
| WO | 2006050455 A2 | 5/2006 |
| WO | 2012132943 A1 | 10/2012 |
| WO | 2013101947 A1 | 7/2013 |

OTHER PUBLICATIONS

Alvaraez C., "NetApp Deduplication for FAS and V-Series Deployment and Implementation Guide," Technical Report TR-3505, 2011, 75 pages.
Amit et al., "Strategies for Mitigating the IOTLB Bottleneck," Technion—Israel Institute of Technology, IBM Research Haifa, WIOSCA 2010—Sixth Annual Workshop on the Interaction between Operating Systems and Computer Architecture, 2010, 12 pages.
Arpaci-Dusseau R., et al., "Log-Structured File Systems," Operating Systems: Three Easy Pieces published by Arpaci-Dusseau Books, May 25, 2014, 15 pages.
Balakrishnan M., et al., "CORFU: A Shared Log Design for Flash Clusters," Microsoft Research Silicon Vally, University of California, San Diego, Apr. 2012, https://www.usenix.org/conference/nsdi12/technical-sessions/presentation/balakrishnan, 14 pages.
Ben-Yehuda et al., "The Price of Safety: Evaluating IOMMU Performance," Proceedings of the Linux Symposium, vol. 1, Jun. 27-30, 2007, pp. 9-20.
Bitton D. et al., "Duplicate Record Elimination in Large Data Files," Oct. 26, 1999, 11 pages.
Bogaerdt, "cdeftutorial," http://oss.oetiker.ch/rrdtool/tut/cdeftutorial.en.html Date obtained from the internet, Sep. 9, 2014, 14 pages.
Bogaerdt, "Rates, Normalizing and Consolidating," http://www.vandenbogaerdl.nl/rrdtool/process.php Date obtained from the internet: Sep. 9, 2014, 5 pages.
Bogaerdt, "rrdtutorial," http://oss.oetiker.ch/rrdtool/lul/rrdtutorial.en.html Date obtained from the internet, Sep. 9, 2014, 21 pages.
Chris K., et al., "How many primes are there?" Nov. 2001. https://web.archive.org/web/20011120073053/http://primes.utm.edu/howmany.shtml.
Cornwellm., "Anatomy of a Solid-state Drive," ACM Queue—Networks, Oct. 2012, vol. 10 (10), pp. 1-7.
Culik K., et al., "Dense Multiway Trees," ACM Transactions on Database Systems, Sep. 1981, vol. 6 (3), pp. 486-512.
Debnath B., et al., "FlashStore: High Throughput Persistent Key-Value Store," Proceedings of the VLDB Endowment VLDB Endowment, Sep. 2010, vol. 3 (1-2), pp. 1414-1425.
Debnath, et al., "ChunkStash: Speeding up In line Storage Deduplication using Flash Memory," USENIX, USENIXATC '10, Jun. 2010, 15 pages.
Dictionary definition for references, retrieved from: http://www.dictionary.com/browse/reference?s=t on Dec. 23, 2017.
Enclopedia entry for pointers vs. references, retrieved from: https://www.geeksforgeeks.org/pointers-vs-references-cpp/ on Dec. 23, 2017.
Extended European Search Report for Application No. 20201330.6 dated Dec. 8, 2020, 7 pages.
Extended European Search Report for Application No. 20205866.5 dated Dec. 8, 2020, 7 pages.
Extended European Search Report dated Apr. 9, 2018 for EP Application No. 15855480.8 filed Oct. 22, 2015, 7 pages.
Fan, et al., "MemC3: Compact and Concurrent MemCache with Dumber Caching and Smarter Hashing," USENIX NSDI '13, Apr. 2013, pp. 371-384.
Gal E., et al., "Algorithms and Data Structures for Flash Memories," ACM Computing Surveys (CSUR) Archive, Publisher ACM, New York City, NY, USA, Jun. 2005, vol. 37 (2), pp. 138-163.
Gray J., et al., "Flash Disk Opportunity for Server Applications," Queue—Enterprise Flash Storage, Jul.-Aug. 2008, vol. 6 (4), pp. 18-23.
Gulati A., et al., "BASIL: Automated IO Load Balancing Across Storage Devices," Proceedings of the 8th USENIX Conference on File and Storage Technologies, FAST'10, Berkeley, CA, USA, 2010, 14 pages.
Handy J., "SSSI Tech Notes: How Controllers Maximize SSD Life," SNIA, Jan. 2013, pp. 1-20.
Hwang K., et al., "RAID-x: A New Distributed Disk Array for I/O-centric Cluster Computing," IEEE High-Performance Distributed Computing, Aug. 2000, pp. 279-286.
IBM Technical Disclosure Bulletin, "Optical Disk Axial Runout Test", vol. 36, No. 10, NN9310227, Oct. 1, 1993, 3 pages.
Intel, Product Specification—Intel® Solid-State Drive DC S3700, Jun. 2013, 32 pages.
International Search Report and Written Opinion for Application No. PCT/EP2014/071446 dated Apr. 1, 2015, 14 pages.
International Search Report and Written Opinion for Application No. PCT/US2012/071844 dated Mar. 1, 2013, 12 pages.
International Search Report and Written Opinion for Application No. PCT/US2014/035284 dated Apr. 1, 2015, 8 pages.
International Search Report and Written Opinion for Application No. PCT/US2014/055138 dated Dec. 12, 2014, 13 pages.
International Search Report and Written Opinion for Application No. PCT/US2014/058728 dated Dec. 16, 2014, 11 pages.
International Search Report and Written Opinion for Application No. PCT/US2014/060031 dated Jan. 26, 2015, 9 pages.
International Search Report and Written Opinion for Application No. PCT/US2014/071446 dated Apr. 1, 2015, 13 pages.
International Search Report and Written Opinion for Application No. PCT/US2014/071465 dated Mar. 25, 2015, 12 pages.

(56) References Cited

OTHER PUBLICATIONS

International Search Report and Written Opinion for Application No. PCT/US2014/071484 dated Mar. 25, 2015, 9 pages.
International Search Report and Written Opinion for Application No. PCT/US2014/071581 dated Apr. 10, 2015, 9 pages.
International Search Report and Written Opinion for Application No. PCT/US2014/071635 dated Mar. 31, 2015, 13 pages.
International Search Report and Written Opinion for Application No. PCT/US2015/016625 dated Sep. 17, 2015, 8 pages.
International Search Report and Written Opinion for Application No. PCT/US2015/021285 dated Jun. 23, 2015, 8 pages.
International Search Report and Written Opinion for Application No. PCT/US2015/024067 dated Jul. 8, 2015, 7 pages.
International Search Report and Written Opinion for Application No. PCT/US2015/048800 dated Nov. 25, 2015, 11 pages.
International Search Report and Written Opinion for Application No. PCT/US2015/048810 dated Dec. 23, 2015, 11 pages.
International Search Report and Written Opinion for Application No. PCT/US2015/048833 dated Nov. 25, 2015, 11 pages.
International Search Report and Written Opinion for Application No. PCT/US2015/056932 dated Jan. 21, 2016, 11 pages.
International Search Report and Written Opinion for Application No. PCT/US2015/057532 dated Feb. 9, 2016, 12 pages.
International Search Report and Written Opinion for Application No. PCT/US2016/059943 dated May 15, 2017, 14 pages.
International Search Report and Written Opinion for Application No. PCT/US2018/025951, dated Jul. 18, 2018, 16 pages.
Jones, M. Tim, "Next-generation Linux file systems: NiLFS(2) and eofs," IBM, 2009.
Jude Nelson "Syndicate: Building a Virtual Cloud Storage Service Through Service Composition" Princeton University, 2013, pp. 1-14.
Kagel A.S, "two-way merge sort," Dictionary of Algorithms and Data Structures [online], retrieved on Jan. 28, 2015, Retrieved from the Internet: URL: http://xlinux.nist.gov/dads/HTMUIwowaymrgsrl.html, May 2005, 1 page.
Konishi, R., Sato, K., andY. Amagai, "Filesystem Support for Continuous Snapshotting," Ottawa Linux Symposium, 2007.
Lamport L., "The Part-Time Parliament," ACM Transactions on Computer Systems, May 1998, vol. 16 (2), pp. 133-169.
Leventhal A.H., "A File System All its Own," Communications of the ACM Queue, May 2013, vol. 56 (5), pp. 64-67.
Lim H., et al., "SILT: A Memory-Efficient, High-Performance Key-Value Store," Proceedings of the 23rd ACM Symposium on Operating Systems Principles (SOSP'11), Oct. 23-26, 2011, pp. 1-13.
Metreveli et al. "CPHash: A Cache-Partitioned Hash Table." Nov. 2011. https://people.csail.mit.edu/nickolai/papers/metrevelicphash-tr.pdf.
Moshayedi M., et al., "Enterprise SSDs," ACM Queue—Enterprise Flash Storage, Jul.-Aug. 2008, vol. 6 (4), pp. 32-39.
Odlevak, "Simple Kexec Example", https://www.linux.com/blog/simple-kexec-example, accessed on Feb. 5, 2019 (Year: 2011), 4 pages.
Oetiker, "rrdfetch," http ://oss.oetiker.ch/rrdtool/doc/rrdfetch .en.html, Date obtained from the internet: Sep. 9, 2014, 5 pages.
Oetiker, "rrdtool," http :/loss. oetiker.ch/rrdtool/doc/rrdtool.en. html Date obtained from the internet: Sep. 9, 2014, 5 pages.
O'Neil P., at al., "The Log-structured Merge-tree (lsm-tree)," Acta Informatica, 33, 1996, pp. 351-385.
Ongaro D., et al., "In Search of an Understandable Consensus Algorithm," Stanford University, URL: https://ramcloud.stanford.edu/wiki/download/attachments/11370504/raft.pdf, May 2013, 14 pages.
Ongaro, et al., "In search of an understandable consensus algorithm (extended version)," 2014, 18 pages.
Pagh R., et al., "Cuckoo Hashing," Elsevier Science, Dec. 8, 2003, pp. 1-27.
Pagh R., et al., "Cuckoo Hashing for Undergraduates," IT University of Copenhagen, Mar. 27, 2006, pp. 1-6.
"Pivot Root", Die.net, retrieved from https://linux.die.net/pivot_root on Nov. 12, 2011 (Year: 2012).
Proceedings of the FAST 2002 Conference on File Storage Technologies, Monterey, California, USA, Jan. 28-30, 2002, 14 pages.
Rosenblum M., et al., "The Design and Implementation of a Log-Structured File System," In Proceedings of ACM Transactions on Computer Systems, vol. 10(1),Feb. 1992, pp. 26-52.
Rosenblum M., et al., "The Design and Implementation of a Log-Structured File System," (SUN00006867-SUN00006881), Jul. 1991, 15 pages.
Rosenblum M., et al., "The Design and Implementation of a Log-Structured File System,"Proceedings of the 13th ACM Symposium on Operating Systems Principles, (SUN00007382-SUN00007396), Jul. 1991, 15 pages.
Rosenblum M., et al., "The LFS Storage Manager," USENIX Technical Conference, Anaheim, CA, (Sun 00007397-SUN00007412), Jun. 1990, 16 pages.
Rosenblum M., et al., "The LFS Storage Manager," USENIX Technical Conference, Computer Science Division, Electrical Engin. and Computer Sciences, Anaheim, CA, presented at Summer '90 USENIX Technical Conference, (SUN00006851-SUN00006866), Jun. 1990, 16 pages.
Rosenblum M., "The Design and Implementation of a Log-Structured File System," UC Berkeley, 1992, pp. 1-101.
Sears., et al., "Blsm: A General Purpose Log Structured Merge Tree," Proceedings of the 2012 ACM SIGMOD International Conference on Management, 2012, 12 pages.
Seltzer M., et al., "An Implementation of a Log Structured File System for UNIX," Winter USENIX, San Diego, CA, Jan. 25-29, 1993, pp. 1-18.
Seltzer M.I., et al., "File System Performance and Transaction Support," University of California at Berkeley Dissertation, 1992, 131 pages.
Smith K., "Garbage Collection," Sand Force, Flash Memory Summit, Santa Clara, CA, Aug. 2011, pp. 1-9.
Stoica et al. "Chord: A Scalable Peer-to-peer Lookup Service for Internet Applications." Aug. 2001. ACM. SIGCOMM 01.
Supplementary European Search Report for Application No. EP12863372 dated Jul. 16, 2015, 7 pages.
Texas Instruments, User Guide, TMS320C674x/OMAP-L1 x Processor Serial ATA (SATA) Controller, Mar. 2011, 76 Pages.
Twigg A., et al., "Stratified B-trees and Versioned Dictionaries," Proceedings of the 3rd US EN IX Conference on Hot Topics in Storage and File Systems, 2011, vol. 11, pp. 1-5.
Waskiewicz, PJ, "Scaling With Multiple Network Namespaces in a Single Application", Netdev 1.2—The Technical Conferenceon Linux Networking, retrieved from internet: URL; https://netdevconf.orq/1.2/papers/pj-netdev-1.2pdf Dec. 12, 2016, 5 pages.
Wei, Y. and D. Shin, "NAND Flash Storage Device Performance in Linux File System," 6th International Conference on Computer Sciences and Convergence Information Technology (ICCIT), 2011.
Wikipedia, "Cuckoo hashing," http://en.wikipedia.org/wiki/Cuckoo_hash, Apr. 2013, pp. 1-5.
Wilkes J., et al., "The Hp Auto Raid Hierarchical Storage System," Operating System Review, ACM, New York, NY, Dec. 1, 1995, vol. 29 (5), pp. 96-108.
Wu P-L., et al., "A File-System-Aware FTL Design for Flash-Memory Storage Systems," IEEE, Design, Automation & Test in Europe Conference & Exhibition, 2009, pp. 1-6.
Yossef, "BuildingMurphy-compatible embedded Linux Systems", Proceedings of the Linux Symposium,Ottawa, Ontario Canada, Jul. 20-23, 2005 (Year: 2005).

* cited by examiner

QUALITY OF SERVICE POLICY SETS

CROSS-REFERENCE TO RELATED PATENTS

This application is a continuation of U.S. patent application Ser. No. 16/867,418, filed on May 5, 2020, now U.S. Pat. No. 10,997,098, which is a continuation of U.S. patent application Ser. No. 15/270,973, filed on Sep. 20, 2016, now U.S. Pat. No. 10,642,763, both of which are hereby incorporated by reference in their entirety for all purposes.

BACKGROUND

The following description is provided to assist the understanding of the reader. None of the information provided is admitted to be prior art.

In data storage architectures, a client's data may be stored in a volume. The client can access the client data from the volume via one or more volume servers coupled to the volume. The volume servers can map the locations of the data specified by the client, such as file name, drive name, etc., into unique identifiers that are specific to the location of the client's data on the volume. Using the volume server as an interface to the volume allows the freedom to distribute the data evenly over the one or more volumes. The even distribution of data can be beneficial in terms of volume and system performance.

Read and write requests of the client are typically transformed into read and/or write input/output operations (IOPS). For example, a file read request by a client can be transformed into one or more read IOPS of some size. Similarly, a file write request by the client can be transformed into one or more write IOPS.

BRIEF DESCRIPTION OF THE DRAWINGS

The foregoing and other features of the present disclosure will become more fully apparent from the following description and appended claims, taken in conjunction with the accompanying drawings.

DETAILED DESCRIPTION OF EXAMPLE EMBODIMENTS

Overview

Figure 1A:
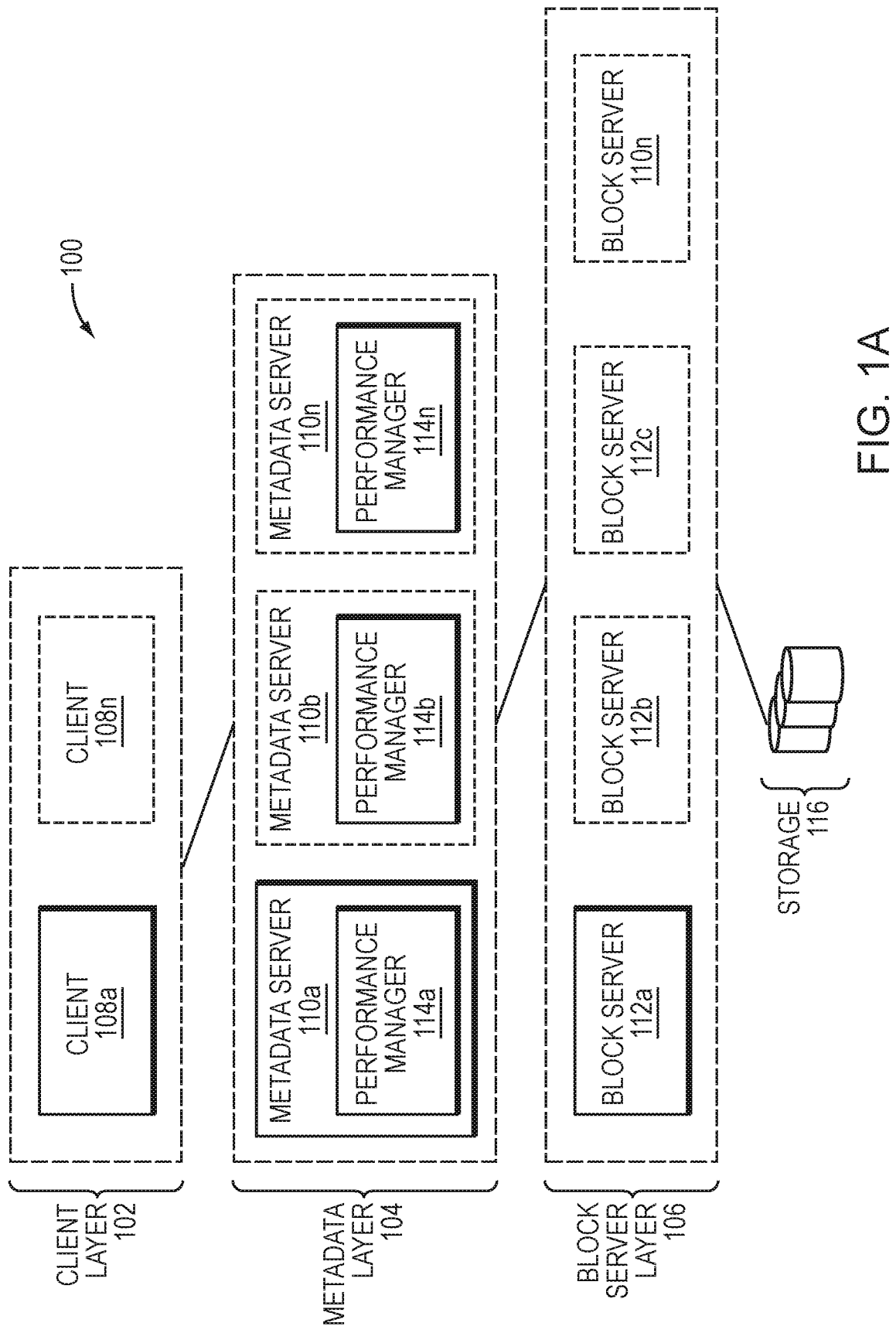
FIG. 1A depicts a simplified system for performance management in a storage system in accordance with an illustrative implementation.

In one embodiment, a method for managing input-output operations within a system including at least one client and storage system includes receiving, at a processor, a number of allocated total input-output operations (IOPS), a number of allocated read IOPS and a number of allocated write IOPS for at least one client accessing a storage system during a first time period. Each of the number of allocated read TOPS and the number of allocated write TOPS is not greater than the number of allocated total IOPS. The method further includes receiving, at the processor, a requested number of write IOPS associated with the at least one client's request to write to the storage system. The method also includes determining, at the processor, a target write IOPS based on the number of allocated total IOPS, the number of allocated write IOPS and the requested number of write IOPS. The method further includes executing, by the processor, the determined target write IOPS within the first time period.

In one or more embodiments, a system includes a storage system and a processor coupled to the storage system. The storage system is configured to store client data. The processor is configured to receive a number of allocated total input-output operations (IOPS), a number of allocated read IOPS and a number of allocated write IOPS for at least one client accessing a storage system during a first time period. Each of the number of allocated read IOPS and the number of allocated write IOPS is not greater than the number of allocated total IOPS. The processor is further configured to receiving a requested number of write IOPS associated with the at least one client's request to write to the storage system. The processor is additionally configured to determine a target write IOPS based on the number of allocated total IOPS, the number of allocated write IOPS, and the requested number of write IOPS. The processor is also configured to execute the determined target write IOPS within the first time period.

The foregoing summary is illustrative only and is not intended to be in any way limiting. In addition to the illustrative aspects, implementations, and features described above, further aspects, implementations, and features will become apparent by reference to the following drawings and the detailed description.

Specific Example Embodiments

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way. Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

DETAILED DESCRIPTION

Described herein are techniques for a performance management storage system. In the following description, for purposes of explanation, numerous examples and specific details are set forth in order to provide a thorough understanding of various implementations. Particular implementations as defined by the claims may include some or all of the features in these examples alone or in combination with other features described below, and may further include modifications and equivalents of the features and concepts described herein.

Storage System

FIG. 1A depicts a simplified system for performance management in a storage system 100 in accordance with an illustrative implementation. System 100 includes a client layer 102, a metadata layer 104, a block server layer 106, and storage 116.

Before discussing how particular implementations manage performance of clients 108, the structure of a possible system is described. Client layer 102 includes one or more clients 108a-108n. Clients 108 include client processes that may exist on one or more physical machines. When the term "client" is used in the disclosure, the action being performed may be performed by a client process. A client process is responsible for storing, retrieving, and deleting data in system 100. A client process may address pieces of data depending on the nature of the storage system and the format of the data stored. For example, the client process may reference data using a client address. The client address may take different forms. For example, in a storage system that uses file storage, client 108 may reference a particular volume or partition, and a file name. With object storage, the client address may be a unique object name. For block storage, the client address may be a volume or partition, and a block address. Clients 108 communicate with metadata layer 104 using different protocols, such as small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol.

Metadata layer 104 includes one or more metadata servers 110a-110n. Performance managers 114 may be located on metadata servers 11 0a-11 0n. Block server layer 106 includes one or more block servers 112a-112n. Block servers 112a-112n are coupled to storage 116, which stores volume data for clients 108. Each client 108 may be associated with a volume. In one implementation, only one client 108 accesses data in a volume; however, multiple clients 108 may access data in a single volume.

Storage 116 can include multiple solid state drives (SSDs). In one implementation, storage 116 can be a cluster of individual drives coupled together via a network. When the term "cluster" is used, it will be recognized that cluster may represent a storage system that includes multiple disks that may not be networked together. In one implementation, storage 116 uses solid state memory to store persistent data. SSDs use microchips that store data in non-volatile memory chips and contain no moving parts. One consequence of this is that SSDs allow random access to data in different drives in an optimized manner as compared to drives with spinning disks. Read or write requests to non-sequential portions of SSDs can be performed in a comparable amount of time as compared to sequential read or write requests. In contrast, if spinning disks were used, random read/writes would not be efficient since inserting a read/write head at various random locations to read data results in slower data access than if the data is read from sequential locations. Accordingly, using electromechanical disk storage can require that a client's volume of data be concentrated in a small relatively sequential portion of the cluster to avoid slower data access to non-sequential data. Using SSDs removes this limitation.

In various implementations, non-sequentially storing data in storage 116 is based upon breaking data up into one more storage units, e.g., data blocks. A data block, therefore, is the raw data for a volume and may be the smallest addressable unit of data. The metadata layer 104 or the client layer 102 can break data into data blocks. The data blocks can then be stored on multiple block servers 112. Data blocks can be of a fixed size, can be initially a fixed size but compressed, or can be of a variable size. Data blocks can also be segmented based on the contextual content of the block. For example, data of a particular type may have a larger data block size compared to other types of data. Maintaining segmentation of the blocks on a write (and corresponding re-assembly on a read) may occur in client layer 102 and/or metadata layer 104. Also, compression may occur in client layer 102, metadata layer 104, and/or block server layer 106.

In addition to storing data non-sequentially, data blocks can be stored to achieve substantially even distribution across the storage system. In various examples, even distribution can be based upon a unique block identifier. A block identifier can be an identifier that is determined based on the content of the data block, such as by a hash of the content. The block identifier is unique to that block of data. For example, blocks with the same content have the same block identifier, but blocks with different content have different block identifiers. To achieve even distribution, the values of possible unique identifiers can have a uniform distribution. Accordingly, storing data blocks based upon the unique identifier, or a portion of the unique identifier, results in the data being stored substantially evenly across drives in the cluster.

Because client data, e.g., a volume associated with the client, is spread evenly across all of the drives in the cluster, every drive in the cluster is involved in the read and write paths of each volume. This configuration balances the data and load across all of the drives. This arrangement also removes hot spots within the cluster, which can occur when client's data is stored sequentially on any volume.

In addition, having data spread evenly across drives in the cluster allows a consistent total aggregate performance of a cluster to be defined and achieved. This aggregation can be achieved, since data for each client is spread evenly through the drives. Accordingly, a client's I/O will involve all the drives in the cluster. Since, all clients have their data spread substantially evenly through all the drives in the storage system, a performance of the system can be described in aggregate as a single number, e.g., the sum of performance of all the drives in the storage system.

Block servers 112 and slice servers 124 maintain a mapping between a block identifier and the location of the data block in a storage medium of block server 112. A volume includes these unique and uniformly random identifiers, and so a volume's data is also evenly distributed throughout the cluster.

Metadata layer 104 stores metadata that maps between client layer 102 and block server layer 106. For example, metadata servers 110 map between the client addressing used by clients 108 (e.g., file names, object names, block numbers, etc.) and block layer addressing (e.g., block identifiers) used in block server layer 106. Clients 108 may perform access based on client addresses. However, as described above, block servers 112 store data based upon identifiers and do not store data based on client addresses. Accordingly, a client can access data using a client address which is eventually translated into the corresponding unique identifiers that reference the client's data in storage 116.

Although the parts of system 100 are shown as being logically separate, entities may be combined in different fashions. For example, the functions of any of the layers may be combined into a single process or single machine (e.g., a computing device) and multiple functions or all functions may exist on one machine or across multiple machines. Also, when operating across multiple machines, the machines may communicate using a network interface, such as a local area network (LAN) or a wide area network (WAN). In one implementation, one or more metadata servers 110 may be combined with one or more block servers 112 in a single machine. Entities in system 100 may be virtualized entities. For example, multiple virtual block servers 112 may be included on a machine. Entities may also be included in a cluster, where computing resources of the cluster are virtualized such that the computing resources appear as a single entity.

Figure 1B:
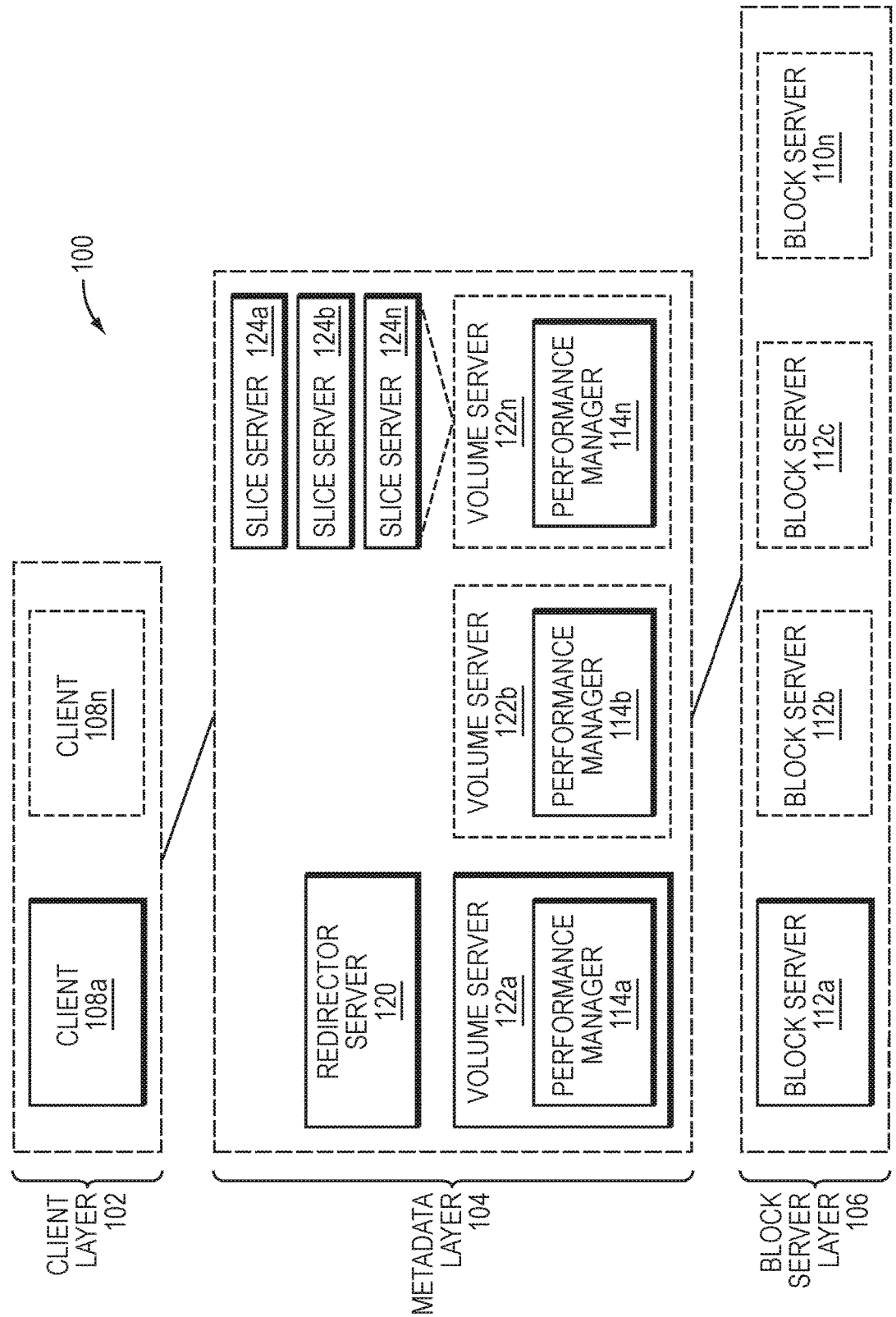
FIG. 1B depicts a more detailed example of a system m accordance with an illustrative implementation.

FIG. 1B depicts a more detailed example of system 100 according to one implementation. Metadata layer 104 may include a redirector server 120 and multiple volume servers 122. Each volume server 122 may be associated with a plurality of slice servers 124.

In this example, client 108a wants to connect to a volume (e.g., client address). Client 108a communicates with redirector server 120, identifies itself by an initiator name, and also indicates a volume by target name that client 108a wants to connect to. Different volume servers 122 may be responsible for different volumes. In this case, redirector server 120 is used to redirect the client to a specific volume server 122. To client 108, redirector server 120 may represent a single point of contact. The first request from client 108a then is redirected to a specific volume server 122. For example, redirector server 120 may use a database of volumes to determine which volume server 122 is a primary volume server for the requested target name. The request from client 108a is then directed to the specific volume server 122 causing client 108a to connect directly to the specific volume server 122. Communications between client 108a and the specific volume server 122 may then proceed without redirector server 120.

Volume server 122 performs functions as described with respect to metadata server 110. Additionally, each volume server 122 includes a performance manager 114. For each volume hosted by volume server 122, a list of block identifiers is stored with one block identifier for each logical block on the volume. Each volume may be replicated between one or more volume servers 122 and the metadata for each volume may be synchronized between each of the volume servers 122 hosting that volume. If volume server 122 fails, redirector server 120 may direct client 108 to an alternate volume server 122.

In one implementation, the metadata being stored on volume server 122 may be too large for one volume server 122. Thus, multiple slice servers 124 may be associated with each volume server 122. The metadata may be divided into slices and a slice of metadata may be stored on each slice server 124. When a request for a volume is received at volume server 122, volume server 122 determines which slice server 124 contains metadata for that volume. Volume server 122 then routes the request to the appropriate slice server 124. Accordingly, slice server 124 adds an additional layer of abstraction to volume server 122.

The above structure allows storing of data evenly across the cluster of disks. For example, by storing data based on block identifiers, data can be evenly stored across drives of a cluster. As described above, data evenly stored across the cluster allows for performance metrics to manage load in system 100. If the system 100 is under a load, clients can be throttled or locked out of a volume. When a client is locked out of a volume, metadata server 110 or volume server 122 may close the command window or reduce or zero the amount of read or write data that is being processed at a time for client 108. The metadata server 110 or the volume server 122 can queue access requests for client 108, such that IO requests from the client 108 can be processed after the client's access to the volume resumes after the lock out period.

Performance Metrics and Load of the Storage System

The storage system 100 can also include a performance manager 114 that can monitor clients' use of the storage system's resources. In addition, performance manager 114 can regulate the client's use of the storage system 100. The client's use of the storage system can be adjusted based upon performance metrics, the client's quality of service parameters, and the load of the storage system. Performance metrics are various measurable attributes of the storage system. One or more performance metrics can be used to calculate a load of the system, which, as described in greater detail below, can be used to throttle clients of the system.

Performance metrics can be grouped in different categories of metrics. System metrics is one such category. System metrics are metrics that reflect the use of the system or components of the system by all clients. System metrics can include metrics associated with the entire storage system or with components within the storage system. For example, system metrics can be calculated at the system level, cluster level, node level, service level, or drive level. Space utilization is one example of a system metric. The cluster space utilization reflects how much space is available for a particular cluster, while the drive space utilization metric reflects how much space is available for a particular drive. Space utilization metrics can also be determined for at the system level, service level, and the node level. Other examples of system metrics include measured or aggregated metrics such as read latency, write latency, input/output operations per second (IOPS), read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients 108 and the volume of data. Read latency can be the time taken for the system 100 to read data from a volume and return the data to a client. Write latency can be the time taken for the system to write data and return a success indicator to the client. Workload type can indicate if IO access is sequential or random. The data type can identify the type of data being accessed/written, e.g., text, video, images, audio, etc. The write cache capacity refers to a write cache or a node, a block server, or a volume server. The write cache is relatively fast memory that is used to store data before it is written to storage 116. As noted above, each of these metrics can be independently calculated for the system, a cluster, a node, etc. In addition, these values can also be calculated at a client level.

Client metrics are another category of metrics that can be calculated. Unlike system metrics, client metrics are calculated taking into account the client's use of the system. As described in greater detail below, a client metric may include use by other client's that are using common features of the system. Client metrics, however, will not include use of non-common features of the system by other clients. In one implementation, client metrics can include the same metrics as the system metrics, but rather than being component or system wide, are specific to a volume of the client. For example, metrics such as read latency or write IOPS can be monitored for a particular volume of a client.

Metrics, both system and client, can be calculated over a period of time, e.g., 250 ms, 500 ms, 1 s, etc. Accordingly, different values such as a min, max, standard deviation, average, etc., can be calculated for each metric. One or more of the metrics can be used to calculate a value that represents a load of the storage system. Loads can be calculated for the storage system as a whole, for individual components, for individual services, and/or individual clients. Load values, e.g., system load values and/or client load values, can then be used by the quality of service system to determine if and how clients should be throttled.

As described in greater detail below, performance for individual clients can be adjusted based upon the monitored metrics. For example, based on a number of factors, such as system metrics, client metrics, and client quality of service parameters, a number of IOPS that can be performed by a client 108 over a period of time may be managed. In one implementation, performance manager 114 regulates the number of IOPS that are performed by locking client 108 out of a volume for different amounts of time to manage how many IOPS can be performed by client 108. For example, when client 108 is heavily restricted, client 108 may be locked out of accessing a volume for 450 milliseconds every 500 milliseconds and when client 108 is not heavily restricted, client 108 is blocked out of a volume every 50 milliseconds for every 500 milliseconds. The lockout effectively manages the number of IOPS that client 108 can perform every 500 milliseconds. Although examples using IOPS are described, other metrics may also be used, as will be described in more detail below.

The use of metrics to manage load in system 100 is possible because a client's effect on global cluster performance is predictable due to the evenness of distribution of data, and therefore, data load. For example, by locking out client 108 from accessing the cluster, the load in the cluster may be effectively managed. Because load is evenly distributed, reducing access to the client's volume reduces that client's load evenly across the cluster. However, conventional storage architectures where hot spots may occur result in unpredictable cluster performance Thus, reducing access by a client may not alleviate the hot spots because the client may not be accessing the problem areas of the cluster. Because in the described embodiment, client loads are evenly distributed through the system, a global performance pool can be calculated and individual client contributions to how the system is being used can also be calculated.

Client Quality of Service Parameters

In addition to system metrics and client metrics, client quality of service (QoS) parameters can be used to affect how a client uses the storage system. Unlike metrics, client QoS parameters are not measured values, but rather variables than can be set that define the desired QoS bounds for a client. Client QoS parameters can be set by an administrator or a client. In one implementation, client QoS parameters include minimum, maximum, and max burst values. Using IOPS as an example, a minimum IOPS value is a proportional amount of performance of a cluster for a client. Thus, the minimum IOPS is not a guarantee that the volume will always perform at this minimum IOPS value. When a volume is in an overload situation, the minimum IOPS value is the minimum number of IOPS that the system attempts to provide the client. However, based upon cluster performance, an individual client's IOPS may be lower or higher than the minimum value during an overload situation. In one implementation, the system 100 can be provisioned such that the sum of the minimum IOPS across all clients is such that the system 100 can sustain the minimum IOPS value for all clients at a given time. In this situation, each client should be able to perform at or above its minimum IOPS value. The system 100, however, can also be provisioned such that the sum of the minimum IOPS across all clients is such that the system 100 cannot sustain the minimum IOPS for all clients. In this case, if the system becomes overloaded through the use of all clients, the client's realized IOPS can be less than the client's minimum IOPS value. In failure situations, the system may also throttle users such that their realized IOPS are less than their minimum IOPS value. A maximum IOPS parameter is the maximum sustained IOPS value over an extended period of time. The max burst IOPS parameter is the maximum IOPS value that a client can "burst" above the maximum IOPS parameter for a short period of time based upon credits. In one implementation, credits for a client are accrued when the client is operating under their respective maximum IOPS parameter. Accordingly, a client will only be able to use the system in accordance with their respective maximum IOPS and maximum burst IOPS parameters. For example, a single client will not be able to use the system's full resources, even if they are available, but rather, is bounded by their respective maximum IOPS and maximum burst IOPS parameters.

Figure 2:
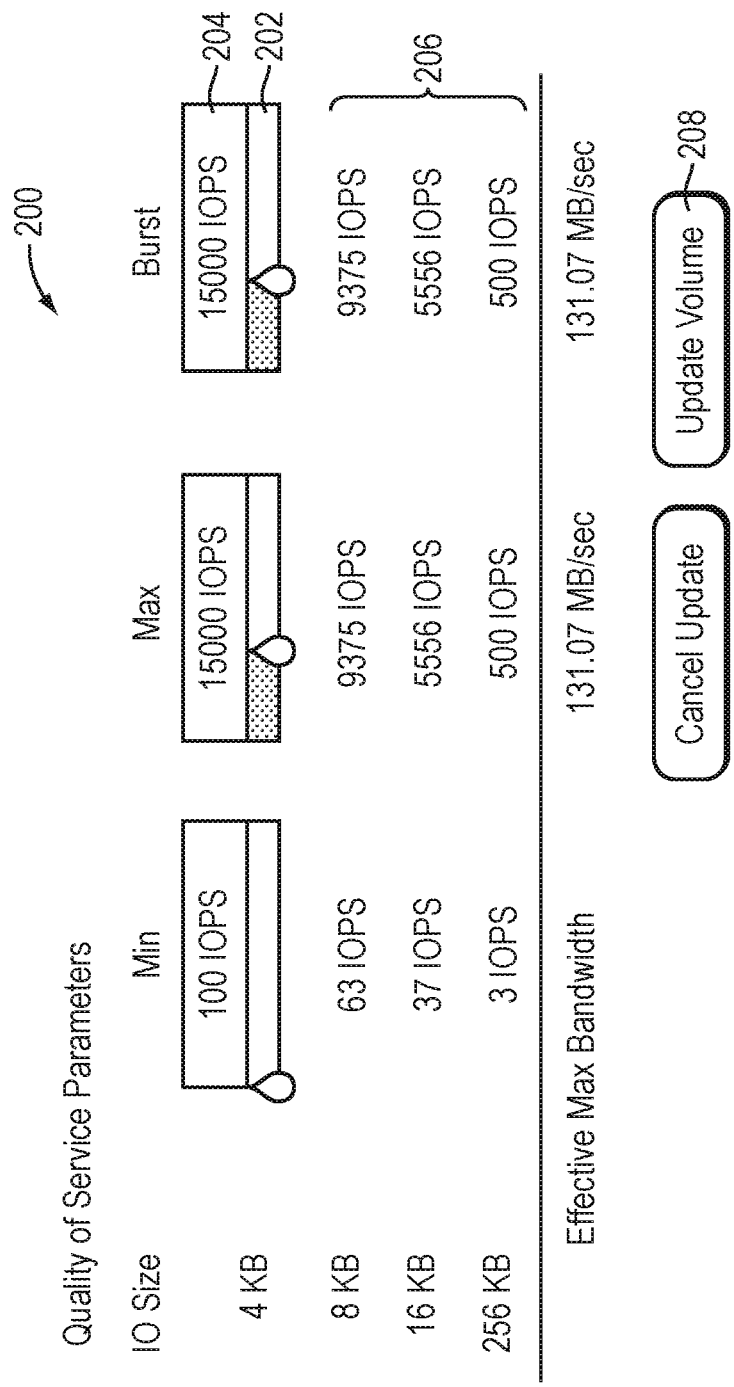
FIG. 2 depicts a user interface for setting quality of service parameters in accordance with an illustrative implementation.

As noted above, client QoS parameters can be changed at any time by the client or an administrator. FIG. 2 depicts a user interface 200 for setting client QoS in accordance with one illustrative implementation. The user interface 200 can include inputs that are used to change various QoS parameters. For example, slide bars 202 and/or text boxes 204 can be used to adjust QoS parameters. As noted above in one implementation, client QoS parameters include a minimum IOPS, a maximum IOPS, and a maximum burst IOPS. Each of these parameters can be adjusted with inputs, e.g., slide bars and/or text boxes. In addition, the IOPS for different size IO operations can be shown. In the user interface 200, the QoS parameters associated with 4 k sized IO operations are changed. When any performance parameter is changed, the corresponding IOPS for different sized IO operations are automatically adjusted. For example, when the burst parameter is changed, IOPS values 206 are automatically adjusted. Once the QoS parameters have been set, activating a save changes button 208 updates the client's QoS parameters. As described below, the target performance manager 402 can use the updated QoS parameters, such that the updated QoS parameters take effect immediately. The updated QoS parameters take effect without requiring any user data to be moved in the system.

Performance Management

Figure 3:
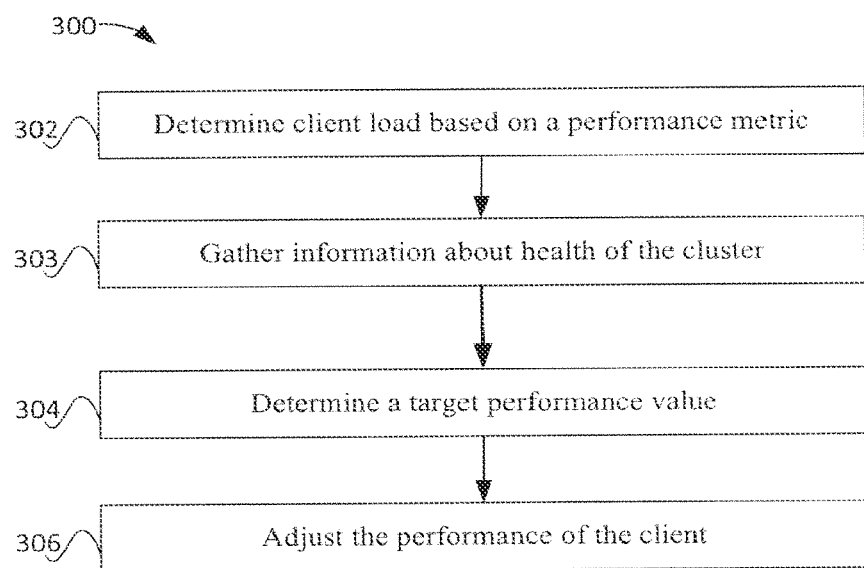
FIG. 3 depicts a simplified flowchart of a method of performing performance management in accordance with an illustrative implementation.

FIG. 3 depicts a simplified flowchart 300 of a method of performing performance management according to one implementation. Additional, fewer, or different operations of the method 300 may be performed, depending on the particular embodiment. The method 300 can be implemented on a computing device. In one implementation, the method 300 is encoded on a computer-readable medium that contains instructions that, when executed by a computing device, cause the computing device to perform operations of the method 300.

At 302, performance manager 114 determines a client load based on one or more performance metrics. For example, performance manager 114 may calculate a client's load based on different performance metrics, such as IOPS, bandwidth, and latency. The metrics may be historical metrics and/or current performance metrics. Historical performance may measure previous performance for an amount of time, such as the last week of performance metrics. Current performance may be real-time performance metrics. Using these performance metrics, e.g., system metrics and/or client metrics, a load value is calculated.

At 303, performance manager 114 gathers information about health of the cluster. The health of the cluster may be information that can quantify performance of the cluster, such as a load value. The cluster health information may be gathered from different parts of system 100, and may include health in many different aspects of system 100, such as system metrics and/or client metrics. In addition, cluster health information can be calculated as a load value from the client and/or system metrics. The health information may not be cluster-wide, but may include information that is local to the volume server 122 that is performing the performance management. The cluster health may be affected; for example, if there is a cluster data rebuild occurring, total performance of the cluster may drop. Also, when data discarding, adding or removing of nodes, adding or removing of volumes, power failures, used space, or other events affecting performance are occurring, performance manager 114 gathers this information from the cluster.

At 304, performance manager 114 determines a target performance value. For example, based on the load values and client quality of service parameters, a target performance value is determined. The target performance value may be based on different criteria, such as load values, client metrics, system metrics, and quality of service parameters. The target performance value is the value at which performance manager 114 would like client 108 to operate. For example, the target performance may be 110 IOPS.

At 306, performance manager 114 adjusts the performance of client 108. For example, the future client performance may be adjusted toward the target performance value. If IOPS are being measured as the performance metric, the number of IOPS a client 108 performs over a period of time may be adjusted to the target performance value. For example, latency can be introduced or removed to allow the number of IOPS that a client can perform to fluctuate. In one example, if the number of IOPS in the previous client performance is 80 and the target performance value is 110 IOPS, then the performance of the client is adjusted to allow client 108 to perform more IOPS such that the client's performance moves toward performing 110 IOPS.

Traditional provisioning systems attempt to achieve a quality of service by placing a client's data on a system that should provide the client with the requested quality of service. A client requesting a change to their quality of service, therefore, can require that the client's data be moved from one system to another system. For example, a client that wants to greatly increase its quality of service may need to be moved to a more robust system to ensure the increased quality of service. Unlike the traditional provisioning systems, the performance manager can dynamically adjust quality of service for specific clients without moving the client's data to another cluster. Accordingly, quality of service for a client can be adjusted instantly, and a client can change QoS parameters without requiring manual intervention for those QoS parameters to take effect. This feature allows the client to schedule changes to their QoS parameters. For example, if a client performs backups on the first Sunday of every month from 2:00 am-4:00 am, they could have their QoS parameters automatically change just prior to the start of the backup and change back after the backup finishes. This aspect allows a client the flexibility to schedule changes to their QoS parameters based upon the client's need. As another example, the client can be presented with a turbo button. When selected, the turbo button increases the client's QoS parameters by some factor, e.g., 3, 4, 5, etc., or to some large amount. Clients could use this feature if their data needs were suddenly increased, such as when a client's website is experiencing a high number of visitors. The client could then unselect the turbo button to return to their original QoS parameters. Clients could be charged for how long they use the turbo button features. In another implementation, the turbo button remains in effect for a predetermined time before the client's original QoS parameters are reset.

In addition to the above examples, clients and/or administrators can set client QoS parameters based upon various conditions. In addition, as noted above client QoS parameters are not limited to IOPS. In different implementations, client QoS parameters can be bandwidth, latency, etc. According to different embodiments, the storage system may be configured or designed to allow service providers, clients, administrators and/or users, to selectively and dynamically configure and/or define different types of QoS and provisioning rules which, for example, may be based on various different combinations of QoS parameters and/or provisioning/QoS target types, as desired by a given user or client.

According to different embodiments, examples of client QoS parameters may include, but are not limited to, one or more of the following (or combinations there:

IOPS;
Bandwidth;
Write Latency;
Read Latency;
Write buffer queue depth;
I/O Size (e.g., amount of bytes accessed per second);
I/O Type (e.g., Read I/Os, Write I/Os, etc.);
Data Properties such as, for example, Workload Type (e.g., Sequential, Random); Dedupe-ability; Compressibility; Data Content; Data Type (e.g., text, video, images, audio, etc.); etc.

According to different embodiments, examples of various provisioning/QoS target types may include, but are not limited to, one or more of the following (or combinations thereof):

Service or group of Services;
Client or group of Clients;
Connection (e.g. Client connection);
Volume, or group of volumes;
Node or group of nodes;
Account/Client;
User;
iSCSI Session;
Time segment;
Read IOPS amount;
Write IOPS amount;
Application Type;
Application Priority;
Region of Volume (e.g., Subset of LBAs);
Volume Session(s);
I/O size;
Data Property type;
etc.

Figure 8:
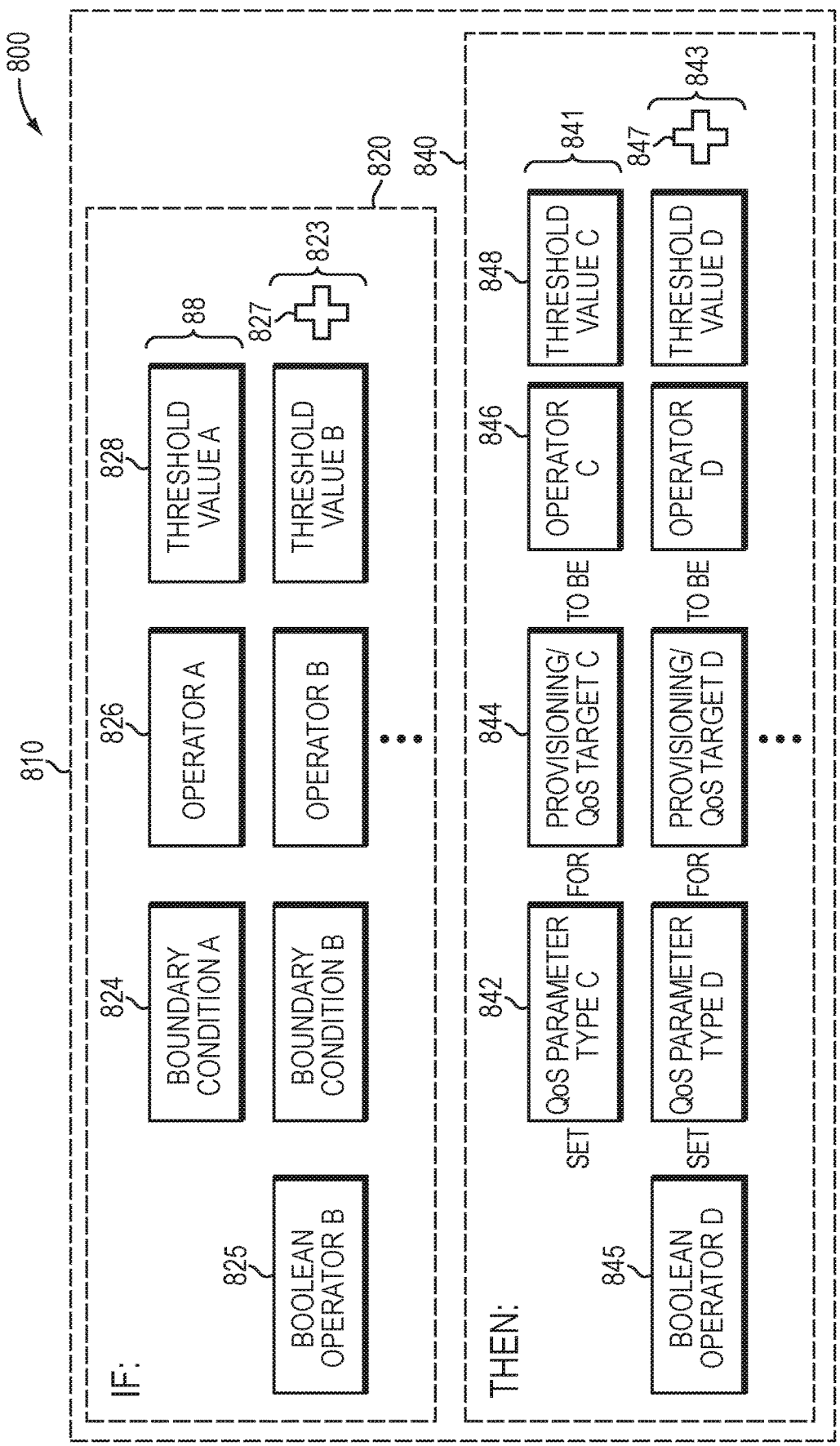
FIG. 8 shows an example QoS Interface GUI 800 which may be configured or designed to enable service providers, users, and/or other entities to dynamically define and/or create different performance classes of use and/or to define performance/QoS related customizations in the storage system in accordance with an illustrative implementation.

FIG. 8 shows an example QoS Interface GUI 800 which may be configured or designed to enable service providers, users, and/or other entities to dynamically define and/or create different performance classes of use and/or to define performance/QoS related customizations in the storage system. In at least one embodiment, the QoS Interface GUI may be configured or designed to allow service providers, users, and/or other entities dynamically switch between the different performance classes of use, allowing such clients to dynamically change their performance settings on the fly (e.g., in real-time).

For example, according to various embodiments, a service provider may dynamically define and/or create different performance classes of use in the storage system, may allow clients to dynamically switch between the different performance classes of use, allowing such clients to dynamically modify or change their performance settings on the fly (e.g., in real-time). In at least one embodiment, the storage system is configured or designed to immediately implement the specified changes for the specified provisioning/QoS Targets, and without requiring the client's storage volume to be taken off-line to implement the performance/QoS modifications. In at least one embodiment, the different performance classes of use may each have associated therewith a respective set of QoS and/or provisioning rules (e.g., 810) which, for example, may be based on various different combinations of QoS parameters and/or provisioning/QoS target types.

The above process for performing performance management may be performed continuously over periods of time. For example, a period of 500 milliseconds is used to evaluate whether performance should be adjusted. As will be described in more detail below, client 108 may be locked out of performing IOPS for a certain amount of time each period to reduce or increase the number of IOPS being performed.

Examples of different types of conditions, criteria and/or other information which may be used to configure the QoS Interface GUI of FIG. 8 may include, but are not limited to, one or more of the following (or combinations thereof):

Example Boundary Conditions (e.g., 824)

| | |
|---|---|
| LOAD(Service); | Date |
| LOAD(Read); | Read IOPS |
| LOAD(Write); | Write IOPS |
| LOAD(Write_Buffer); | Application Type |
| LOAD(Client-Read); | Application Priority |
| LOAD(Client-Write); | Region of Volume |
| LOAD(Client); | LBA ID |
| LOAD(Cluster); | Volume Session ID |
| LOAD(System) | Connection ID |
| Write Latency; | I/O Size |
| Read Latency; | I/O Type |
| Write buffer queue depth; | Workload Type |
| LOAD(Client); | Dedupe-ability |
| Volume ID | Compressibility |
| Group ID | Data Content |
| Account ID | Data Type |
| Client ID | Data Properties |
| User ID | Detectable Condition and/or Event |
| iSCSI Session ID | Etc. |
| Time | |

Example QoS Parameters (e.g., 842)

| | |
|---|---|
| MAX IOPS | I/O Type |
| MIN IOPS | MAX Read I/O |
| BURST IOPS | MIN Read I/O |
| MAX Bandwidth | BURST Read I/O |
| MIN Bandwidth | MAX Write I/O |
| BURST Bandwidth | MIN Write I/O |
| MAX Latency | BURST Write I/O |
| MIN Latency | I/O Type |
| BURST Latency | Workload Type |
| MAX I/O Size | Dedupe-ability |
| MIN I/O Size | Compressibility |
| BURST I/O Size | Data Content |
| Data Type | Billing Amount |

Example Provisioning/QoS Targets (e.g., 844)

| | |
|---|---|
| Cluster ID | Application Type |
| Service ID | Application Priority |
| Client ID | Region of Volume |
| Connection ID | LBA ID |
| Node ID | Volume Session ID |
| Volume ID | Connection ID |
| Group ID | I/O Size |
| Account ID | I/O Type |
| Client ID | Workload Type |
| User ID | Dedupe-ability |
| iSCSI Session ID | Compressibility |
| Time | Data Content |
| Date | Data Type |
| Read IOPS | Data Properties |
| Write IOPS | Etc. |

Example Operators (e.g., 826, 846)

| | |
|---|---|
| Equal To | Not Equal To |
| Less Than | Contains |
| Greater Than | Does Not Contain |
| Less Than or Equal To | Matches |
| Greater Than or Equal To | Regular Expression(s) |
| Within Range of value (e.g., 5000 IOPS/sec) | |

Example Threshold Values (e.g., 828, 848)

| | |
|---|---|
| Alpha-numeric value(s) | Sequential Type |
| Numeric value(s) | Random Type |
| Numeric Range(s) | Text Type |
| Numeric value per Time Interval | Image Type |
| Video Type | Performance Class of Use Value |
| Audio Type | |

Example Boolean Operators (e.g., 825, 845)

| | |
|---|---|
| AND | NAND |
| OR | NOR |
| XOR | XNOR |
| NOT | |
| EXCEPT | |

The following example scenarios help to illustrate the various features and functionalities enabled by the QoS Interface GUI 800, and help to illustrate the performance/QoS related provisioning features of the storage system:

Example A—Configuring/provisioning the storage system to automatically and/or dynamically increase storage performance to enable a backup to go faster during a specified window of time. For example, in one embodiment, the speed of a volume backup operation may be automatically and dynamically increased during a specified time interval by causing a MAX IOPS value and/or MIN IOPS value to be automatically and dynamically increased during that particular time interval.

Example B—Configuring/provisioning the storage system to automatically and/or dynamically enable a selected initiator to perform faster sequential I/Os from 10 pm to Midnight.

Example C—Configuring/provisioning the storage system to automatically and/or dynamically enable a selected application to have increased I/O storage performance.

Example D—Configuring/provisioning the storage system to automatically and/or dynamically enable a selected group of clients to have their respective MAX, MIN and BURST IOPS double on selected days/dates of each month.

Example E—Configuring/provisioning the storage system to present a client or user with a "Turbo Boost" interface which includes a virtual Turbo Button. Client may elect to manually activate the Turbo Button (e.g., on the fly or in real-time) to thereby cause the storage system to automatically and dynamically increase the level of perfom1ance provisioned for that Client. For example, in one embodiment, client activation of the Turbo Button may cause the storage system to automatically and dynamically increase the client's provisioned performance by a factor of 3× for one hour. In at least one embodiment, the dynamic increase in provisioned performance may automatically cease after a predetermined time interval. In at least one embodiment, the storage system may be configured or designed to charge the client an increased billing amount for use of the Turbo Boost service/feature.

Example F—Configuring/provisioning the storage system to automatically and/or dynamically charge an additional fee or billing amount for dynamically providing increased storage array performance (e.g., to allow a faster backup) to go faster at a particular time.

Example G—Configuring/provisioning the storage system to automatically and/or dynamically charge an additional fee or billing amount for IOPS and/or I/O access of the storage system which exceeds minimum threshold value(s) during one or more designated time intervals.

Figure 4:
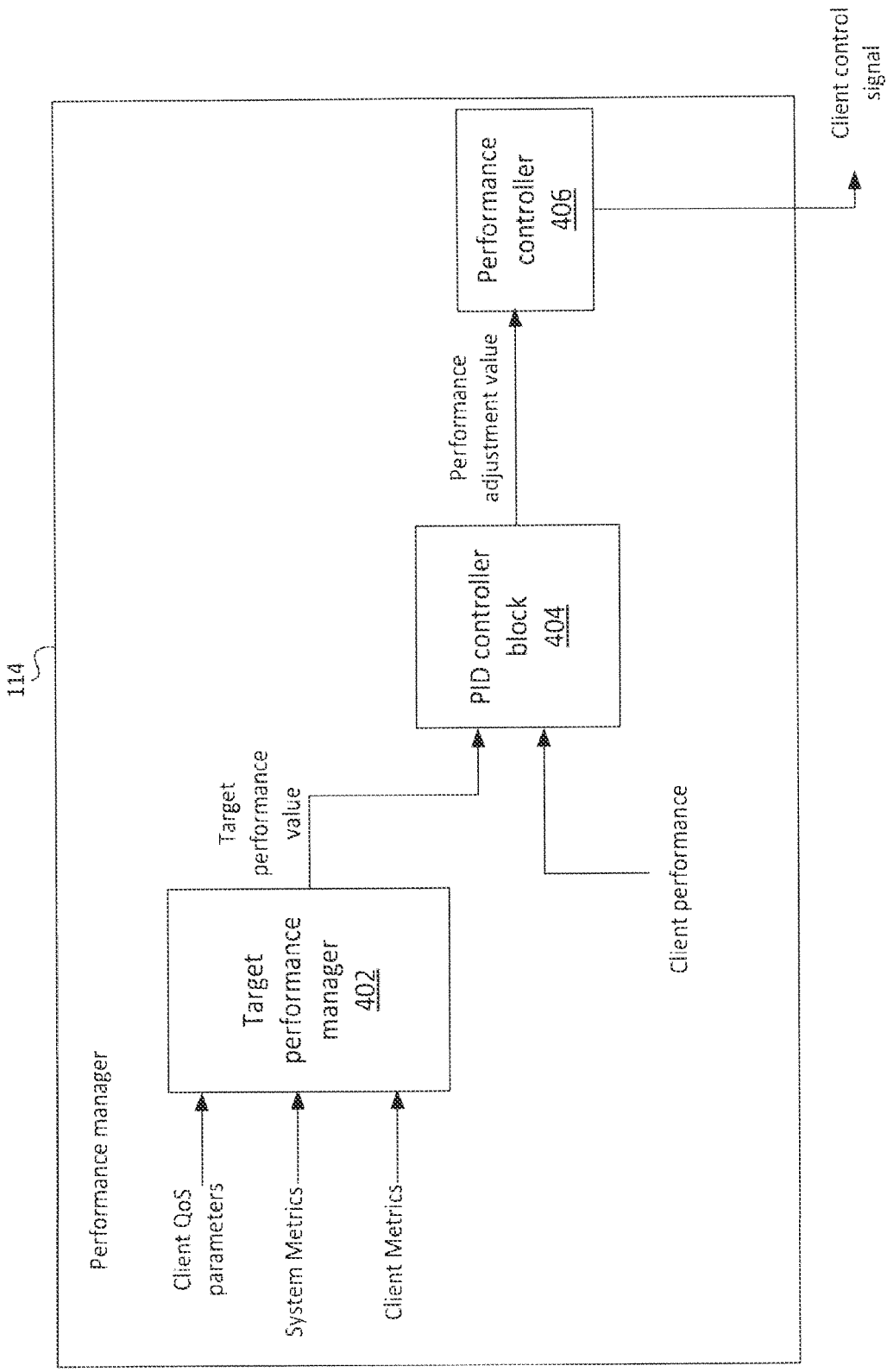
FIG. 4 depicts a more detailed example of adjusting performance using a performance manager in accordance with an illustrative implementation.

Performance manager 114 may use different ways of adjusting performance FIG. 4 depicts a more detailed example of adjusting performance using performance manager 114 according to one implementation. A target performance manager 402 determines a target performance value. In one implementation, target perfom1ance manager 402 uses the client's QoS parameters, system metrics, and client metrics to determine the target performance value. System metrics and client metrics can be used to determine the system load and client load. As an example, client load can be measured based on a client metrics, such as in IOPS, bytes, or latency in milliseconds.

In one implementation, system metrics are data that quantifies the current load of the cluster. Various system load values can be calculated based upon the system metrics. The load values can be normalized measures of system load. For example, different load values can be compared to one another, even if the load values use different metrics in their calculations. As an example, system load can be expressed in a percentage based on the current load of the cluster. In one example, a cluster that is overloaded with processing requests may have a lower value than when the system is not overloaded. In another implementation, the target performance manger 402 receives calculated load values as input, rather than system and/or client metrics.

The target performance manager 402 can read the client QoS parameters, relevant system metrics, and relevant client metrics. These values can be used to determine the target performance value for client 108. The QoS parameters may also be dynamically adjusted during runtime by the administrator or the client as described above, such as when a higher level of performance is desired (e.g., the customer paid for a higher level of performance). The calculation of the target performance value is explained in greater detail below.

In one implementation, the target performance manager 402 outputs the target performance value to a proportion-integral-derivative (PIO) controller block 404. PIO controller block 404 may include a number of PIO controllers for different performance metrics. Although PID controllers are described, other controllers may be used to control the performance of clients 108. In one example, PID controller block 404 includes PID controllers for IOPS, bandwidth, and latency. Target performance manager 402 outputs different target performance values for the performance metrics into the applicable PID controllers. The PID controllers also receive information about previous and/or current client performance and the target performance value. For example, the PID controllers can receive client metrics, system metrics, and/or load values, that correspond with the target performance value. The PID controller can then determine a client performance adjustment value. For example, a PID controller is configured to take feedback of previous client performance and determine a value to cause a system to move toward the target performance value. For example, a PID can cause varied amounts of pressure to be applied, where pressure in this case causes client 108 to slow down, speed up or stay the same in performing IOPS. As an example, if the target performance value is 110 IOPS and client 108 has been operating at 90 IOPS, then the client performance adjustment value is output, which by being applied to the client 108 should increase the number of IOPS being performed.

In one implementation, PIO controller block 404 outputs a performance adjustment value. As an example, the performance adjustment value can be a pressure value that indicates an amount of time that the client is locked out performing JO operations within the storage system. This lock out time will cause client performance to move toward the target performance value. For example, a time in milliseconds is output that is used to determine how long to lock a client 108 out of a volume. Locking a client out of performing JO operations artificially injects latency into the client's JO operations. In another of implementations, the performance adjustment value can be a number of JO operations that the client can perform in a period of time. If the client attempts to do more JO operations, the client can be locked out of doing those JO operations until a subsequent period of time. Locking client 108 out of the volume for different times changes the number of IOPS performed by client 108. For example, locking client 108 out of the volume for shorter periods of time increases the number of IOPS that can be performed by client 108 during that period.

A performance controller 406 receives the performance adjustment value and outputs a client control signal to control the performance of client 108. For example, the amount of lockout may be calculated and applied every half second. In one implementation, clients 108 are locked out by closing and opening a command window, such as an Internet small computer system interface (iSCSI) command window. Closing the command window does not allow a client 108 to issue access requests to a volume and opening the command window allows a client 108 to issue access requests to the volume. Locking clients 108 out of a volume may adjust the number of IOPS, bandwidth, or latency for client 108. For example, if a client 108 is locked out of a volume every 50 milliseconds of every 500 milliseconds as compared to being locked out of the volume for 450 milliseconds of every 500 milliseconds, the client may issue more IOPS. For a bandwidth example, if bandwidth is constrained, then client 108 is locked out of a volume for a longer period of time to increase available bandwidth. In another implementation, the amount of data that is being serviced at a time is modified, either to zero or some number, to affect the perfom1ance at which the system services that client's IO.

Figure 5:
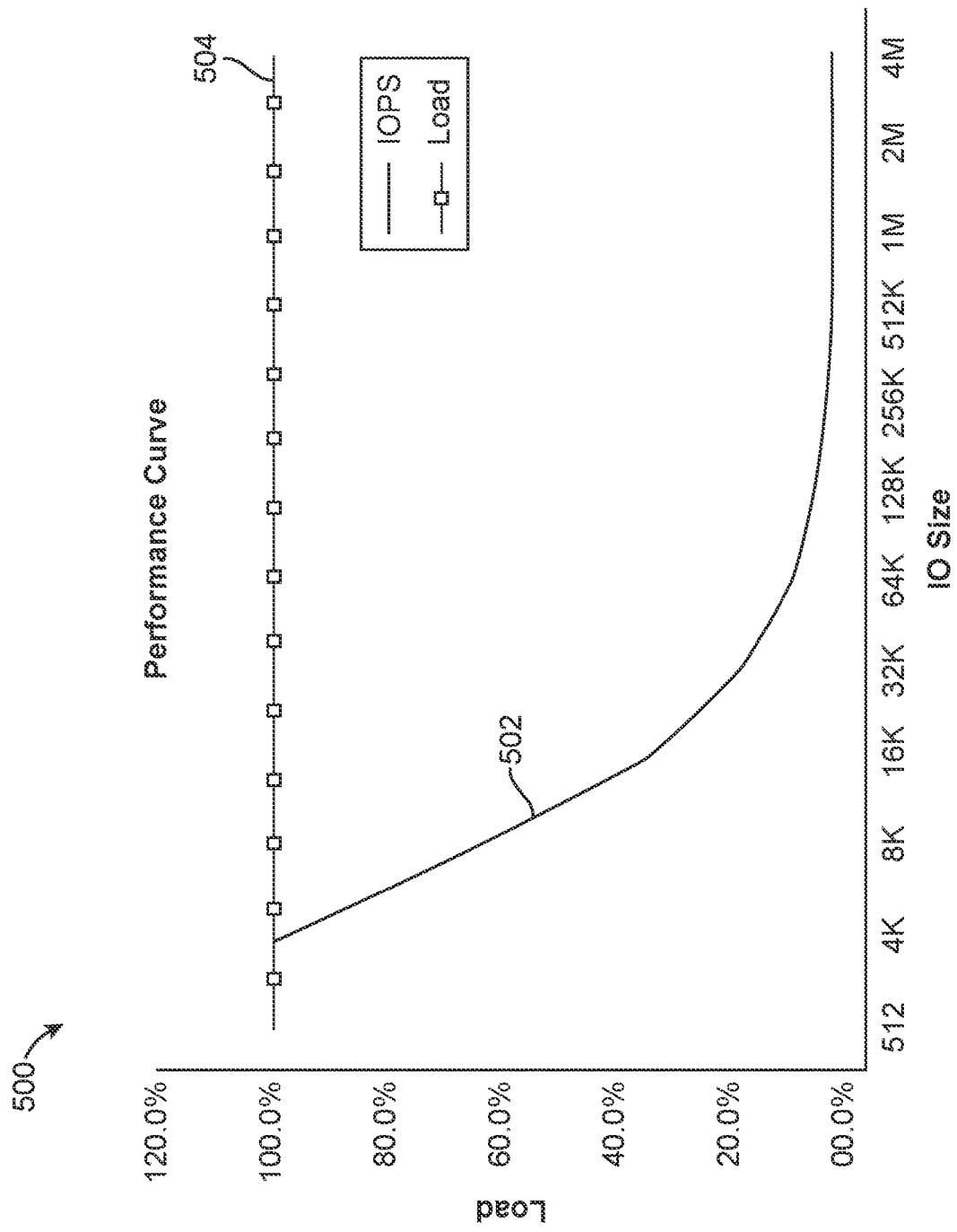
FIG. 5 depicts a performance curve comparing the size of input/output operations with system load in accordance with an illustrative implementation.

As described above, IOPS are metrics that can be used to manage performance of a client. IOPS include both write IOPS and read IOPS. Individual input/output operations do not have a set size. That is, an input operation can be writing 64 k of data to a drive, while another input operation can be writing 4 k of data to the drive. Accordingly, capturing the raw number of input/output operations over a period of time does not necessarily capture how expensive the JO operation actually is. To account for this situation, an input/output operation can be normalized based upon the size of the I/O operation. This feature allows for consistent treatment of IOPS, regardless of each operation's size of the data. This normalization can be achieved using a performance curve. FIG. 5 depicts a performance curve 500 comparing the size of input/output operations, with system load in accordance with an illustrative implementation. Line 504 indicates the system at full load, while line 502 indicates the load of the system for 10 operations of differing sizes. The performance curve can be determined based upon empirical data of the system 100. The perfom1ance curve allows IOPS of different sizes to be compared and to normalize IOPS of different sizes. For example, an IOP of size 32 k is roughly five times more costly than a 4 k IOP. That is, the number of IOPS of size 32 k to achieve 100% load of a system is roughly 20% of the number of IOPS of size 4 k. This is because larger block sizes have a discount of doing IP and not having to process smaller blocks of data. In various implementations, this curve can be used as a factor in deciding a client's target performance value. For example, if the target performance value for a client is determined to be 1,000 IOPS, this number can be changed based upon the average size of IOs the client has done in the past. As an example, if a client's average IO size is 4 k, the client's target performance value can remain at 1,000 IOPS. However, if the client's average IO size is determined to be 32 k, the client's target performance value can be reduced to 200 IOPS, e.g., 1,000*0.2. The 200 IOPS of size 32 k is roughly equivalent to 1,000 IOPS of size 4 k.

In determining a target performance value, the target performance manager 402 uses a client's QoS parameters to determine the target performance value for a client. In one implementation, an overload condition is detected and all clients are throttled in a consistent manner. For example, if the system load is determined to be at 20%, all clients may be throttled such that their target performance value is set to 90% of their maximum IOPS setting. If the system load increases to 50%, all clients can be throttled based upon setting their target performance value to 40% of their maximum IOPS setting.

Clients do not have to be throttled in a similar manner. For example, clients can belong to different classes of uses. Tn one implementation, classes of uses can be implemented simply by setting the QoS parameters of different clients differently. For example, a premium class of use could have higher QoS parameters, e.g., min IOPS, max IOPS, and burst IOPS, values compared to a normal class of use. In another implementation, the class of use can be taken into account when calculating the target performance value. For example, taking two different classes, one class could be throttled less than the other class. Using the example scenario above, clients belonging to the first class could be throttled 80% of their maximum IOPS value when the system load reaches 20%. The second class of clients, however, may not be throttled at all or by a different amount, such as 95% of their maximum IOPS value.

In another implementation, the difference between a client's minimum IOPS and maximum IOPS can be used to determine how much to throttle a particular client. For example, a client with a large difference can be throttled more than a client whose difference is small. In one implementation, the difference between the client's maximum IOPS and minimum IOPS is used to calculate a factor that is applied to calculate the target performance value. In this implementation, the factor can be determined as the IOPS difference divided by some predetermined IOPS amount, such as 5,000 IOPS. In this example, a client whose difference between their maximum IOPS and their minimum IOPS was 10,000, would be throttled twice as much as a client whose IOPS difference was 5,000. Clients of the system can be billed different amounts based upon their class. Accordingly, clients could pay more to be throttled later and/or less than other classes of clients.

In another implementation, throttling of clients can be based upon the client's use of the system. In this implementation, the target performance manager 402 can review system metrics to determine what metrics are currently overloaded. Next, the client metrics can be analyzed to determine if that client is contributing to an overloaded system value. For example, the target performance manager 402 can determine that the system is overloaded when the cluster's write latency is overloaded. The read/write IOPS ratio for a client can be used to determine if a particular client is having a greater impact on the overload condition. Continuing this example, a client whose read/write IOPS ratio was such that the client, vas doing three times more writes than reads and was doing 1,500 writes would be determined to be negatively impacting the performance of the cluster. Accordingly, the target performance manager 402 could significantly throttle this client. In one implementation, this feature can be done by calculating a factor based upon the read/write IOPS ratio. This factor could be applied when calculating the target performance value, such that the example client above would be throttled more than a client whose read/write IOPS ratio was high. In this example, a high read/write IOPS ratio indicates that the client is doing more reads than writes. The factor can also be based upon the number of IOPS that each client is doing. In addition, the number of TOPS for a particular client can be compared to the number of TOPS for the cluster, such that an indication of how heavily a particular client is using the cluster can he detem1ined. Using this information, the target performance manager can calculate another factor than can be used to scale the target perfom1ance value based upon how much a client is using the system compared to all other clients.

Figure 6:
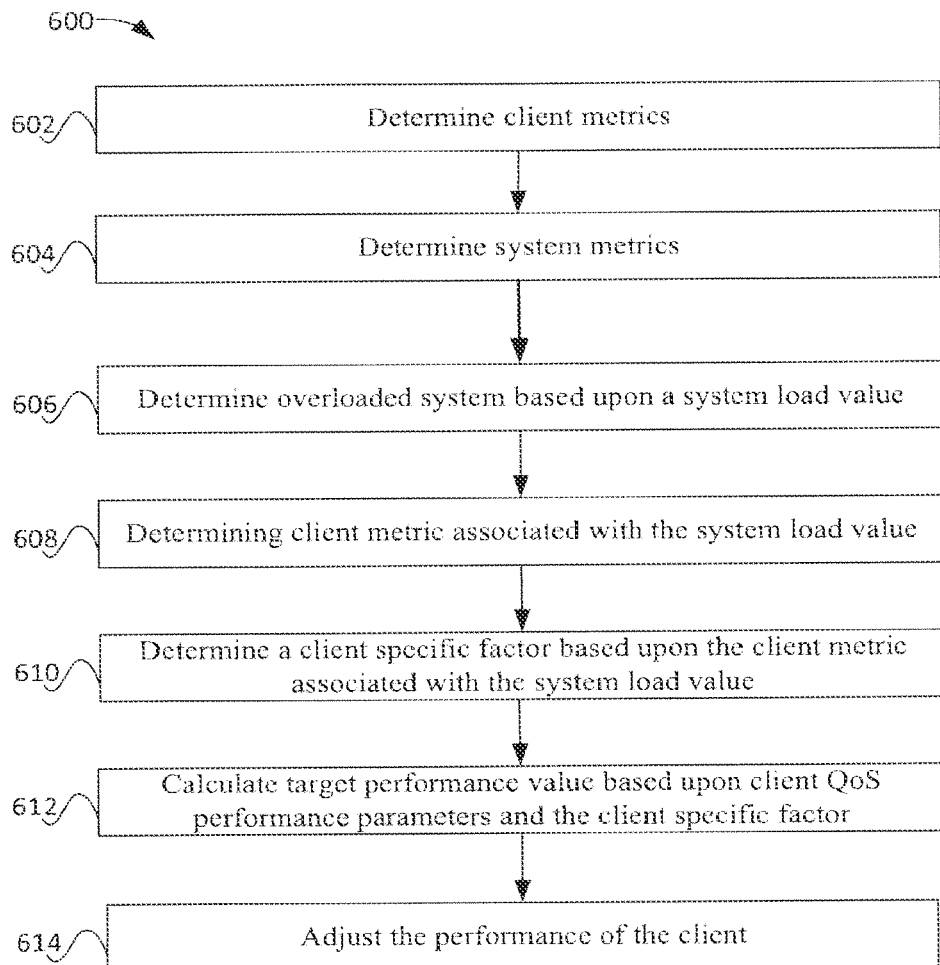
FIG. 6 depicts a simplified flowchart of a method of performing performance management that matches an overloaded system metric with a client metric in accordance with an illustrative implementation.

FIG. 6 depicts a simplified flowchart of a method 600 of performing performance management that matches an overloaded system metric with a client metric in accordance with one illustrative implementation. Additional, fewer, or different operations of the method 600 may he performed, depending on the particular embodiment. The method 600 can be implemented on a computing device. In one implementation, the method 600 is encoded on a computer-readable medium that contains instructions that, when executed by a computing device, cause the computing device to perform operations of the method 600.

In an operation 602, client metrics can be determined. For example, a performance manager 114 can determine client metrics, as described above, for a preceding period of time, e.g., 100 ms, 1 s, 10 s, etc. In an operation 604, system metrics can be determined. For example, the performance manager 114 or another process can dctcm1inc system metrics as described above. In one implementation, the client metrics and/or system metrics are used to calculate one or more load values. In an operation 606, the target performance manager 402 can then determine if the system is overloaded in way based upon various load values. For example, the target performance manager 402 can determine if a system is overloaded by comparing system load values with corresponding thresholds. Any load value above its corresponding threshold indicates an overload condition. In one implementation, the system load values are analyzed in a prioritized order and the first overloaded load value is used to determine how to throttle clients.

In an operation 608, one or more corresponding client metrics associated with the overloaded load value are determined. For example, if the overloaded system load is the number of read operations, the client's number of read operations can be used as the associated client metric. The client's metric does not have to be the same as the overloaded system metric. As another example, if the overloaded system load is read latency, the corresponding client metrics can be the ratio of read to write IO operations and the total number of read operations for a client. In an operation 610, a client-specific factor is detem1ined based upon the client metric associated with the overloaded system load value. In the first example above, the factor can be the number of the client's read operations divided by the total number of read operations of the cluster. The client factor, therefore, would be relative to how much the client is contributing to the system load value. Clients that were dong a relatively larger number of reads would have a greater client metric compared with a client that was doing a relatively smaller number of reads.

In an operation 612, the client-specific factor is used to calculate the target performance value for the client. In one implementation, an initial target performance value can be calculated and then multiplied by the client specific factor. In another implementation, a cluster reduction value is determined and this value is multiplied by the client specific factor. Continuing the example above, the cluster reduction value can be the number of read IOPS that should be throttled. Compared to throttling each client equally based upon the cluster reduction value, using the client-specific factor results in the same number of read IOPS that are throttled, but clients who have a large number of read IO operations are throttled more than clients who have a smaller number of read IO operations. Using client-specific factors helps the target performance manager 402 control the throttling of clients to help ensure that the throttling is effective. For example, if client-specific factors were not used and throttling was applied equally across all clients, a client whose use of the system was not contributing to the system's overloading would be unnecessarily throttled. Worse, the throttling of all of the clients might not be as effective since the throttling of clients who did not need to be throttled would not help ease the overloading condition, which could result in even more throttling being applied to clients.

In an operation 614, the performance manager 114 can adjust the performance of client 108. For example, the client's use of the system can be throttled as described above.

Using the above system, clients 108 may be offered performance guarantees based on performance metrics, such as IOPS. For example, given that system 100 can process a total number of IOPS, the total number may be divided among different clients 108 in tem1S of a number of IOPS within the total amount. The IOPS are allocated using the min, max, and burst. If it is more than the total then possible, the administrator is notified that too many IOPS are being guaranteed and instructed to either add more performance capacity or change the IOP guarantees. This notification may be before a capacity threshold is reached (e.g., full capacity or a pre-defined threshold below full capacity). The notification can be sent before the capacity is reached because client performance is characterized in terms of IOPS and the administrator can be alerted that performance is overprovisioned by N number of IOPS. For example, clients 108 may be guaranteed to be operating between a minimum and maximum number of IOPS over time (with bursts above the maximum at certain times). Performance manager 114 can guarantee perfom1ance within these QoS parameters using the above system. Because load is evenly distributed, hot spots, viii not occur and system 100 may operate around the total amount of TOPS regularly. Thus, without hot spot problems and with system 100 being able to provide the total amount of IOPS regularly, perfom1ance may be guaranteed for clients 108 as the number of IOPS performed by clients 108 are adjusted within the total to make sure each client is operating within the QoS parameters for each given client 108. Since each client's effect on a global pool of performance is measured and predictable, the administrator can consider the entire cluster's performance as a pool of performance as opposed to individual nodes, each with its own performance limits. This feature allows the cluster to accurately characterize its performance and guarantee its ability to deliver performance among all of its volumes.

Accordingly, performance management is provided based on the distributed data architecture. Because data is evenly distributed across all drives in the cluster, the load of each individual volume is also equal across every single drive in storage system 100. This feature may remove hot spots and allow perfom1ance management to be accurate and fairly provisioned and to guarantee an entire cluster performance for individual volumes.

Independent Control of Write IOPS and Read IOPS

In some systems, read and write IOPS are combined and can be controlled at a system level. For example, a storage system can throttle the number of IOPS that are run within a given time period. These systems, therefore, assume that a read and a write IOP are similar in regards to the cost to perform each IOP. Generally, a write IOP is more expensive to complete compared to a read IOP. For example, a write IOP can include both reading and writing metadata compared to a read IOP that can avoid any metadata writes. Treating write IOPS separately from read IOPS at a system level allows for a system to fine tune system perfom1ance. In one example, an overloaded system can throttle writes to help reduce the overloading but allow reads to continue without throttling. This can allow for users of the storage system who are doing mostly reads to see less slowdown compared to a system that would throttle read and write IOPS together.

Figure 7A:
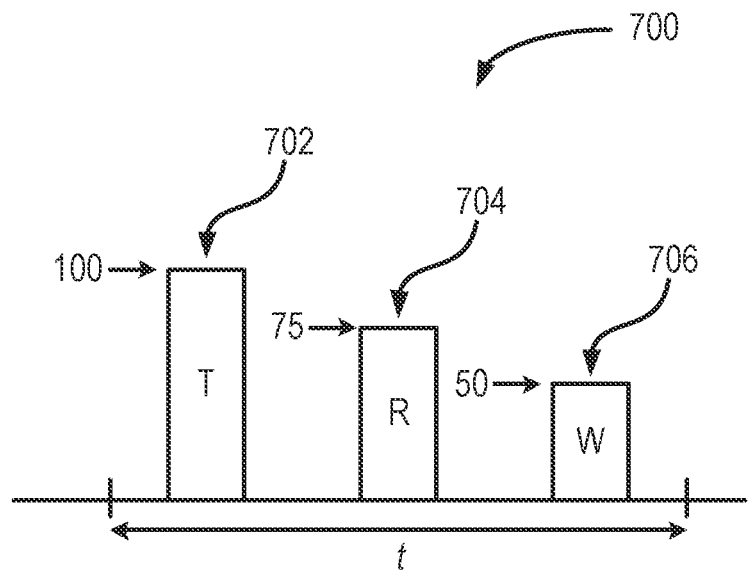
FIG. 7A illustrates an example allocation of input-output operations to a client over a period of time tin accordance with an illustrative implementation.

FIG. 7A illustrates an example allocation of IOPS 700 to a client over a period of time t. In particular, the FIG. 7A shows an allocation of total IOPS 702, read IOPS 704, and write IOPS 706 to a client overtl1e time period t. The client, such as a client 108 shown in FIGS. 1A and 1B, is allocated 100 total IOPS 702. Of the allocated 100 IOPS, the client is allocated a maximum of 75 read IOPS 704 and a maximum of 50 write IOPS 706. That is, even though the client is allocated 100 total IOPS, the IOPS cannot exceed 50 write IOPS and cannot exceed 75 read IOPS. The client can request a combination of a number of write IOPS and a number of read IOPS that satisfy the allocation shown in FIG. 7A. It is understood that the number of total IOPS 702, the read IOPS 704, and the write IOPS 706 can have values different than the ones shown in FIG. 7A, however, the number of read IOPS 704 and the number of write IOPS 706 may not exceed the total number of IOPS 702. For example, in one or more embodiments, the number of read IOPS 704 can be equal to the total number of IOPS 702. As noted above, write IOPS are typically more expensive, in terms of system resources, than read IOPS. Reading and writing of metadata, write access times, etc. are some reasons why writes are more expensive compared to reads. Thus, the system may allow the user to request as many read IOPS as the total IOPS allocated, but limit the number of write IOPS to a number that is substantially smaller than the total IOPS.

The allocation of IOPS 700 is defined over a time period t. The time period t can represent the duration of time over which the QoS parameter for the client is defined. For example, without limitation, the time period t can be equal to about 10 ms to about 1 s.

In one or more embodiments, the allocation of total IOPS 702 shown in FIG. 7A can represent client maximum QoS parameters, such as the maximum TOPS discussed above in relation to FIG. 2. An administrator, for example, can use the user interface 200 shown in FIG. 2 to adjust the total IOPS by adjusting the maximum QoS value using sliders 202. In one or more embodiments, the user interface 200 can also display maximum read IOPS and maximum write IOPS values to the user, and provide the ability to change these values. For example, the user interface can include two additional columns one each for maximum read IOPS and maximum write IOPS. The columns can include rows of IOPS corresponding to each of the various IO sizes, such as 4 KB, 8 KB, 16 KB, and 256 KB. The user interface 200 can additionally include sliders 202 or text boxes to allow setting and changing the values of the total IOPS, read IOPS and write IOPS, in a manner similar to that discussed above in relation to altering the values of minimum IOPS, maximum IOPS, and burst IOPS in FIG. 2.

In one or more embodiments, the allocation of IOPS 700 can be determined by a performance manager, such as the performance manager 114 discussed above in relation to FIG. 1B. In particular, the performance manager 114 can determine the allocation of IOPS 700 based on the result of determining target performance values for the client 108. As discussed above, the performance manager 114 can determine target performance values associated with a client 108 based at least on a load value and client quality of service parameters. The load value can quantify the health of a cluster of storage drives 116 accessed by the clients 108. For example, the load value can refer to the total number of IOPS a cluster of storage drives 116 is receiving and/or processing from one or more clients 108. The client quality of service parameters can refer to the bandwidth allocated to the client 108. In one or more embodiments, the client quality of service parameters can refer to the number of IOPS per unit time promised to a client 108. In one or more embodiments, the performance manager 114 can compare the load value to the client's quality of service parameters, and adjust the target performance values, such as the total IOPS, read IOPS and the write IOPS, such that the load value associated with the cluster of storage drives 116 is maintained at acceptable levels.

In one or more embodiments, the allocation of IOPS 700 shown in FIG. 7A can change over time based on the system and client metrics received by the performance manager 114. For example, if the performance manager 114 determines that it has oversubscribed the available IOPS on the system, the performance manager 114 may dynamically alter the allocation of IOPS such that the available TOPS are appropriately distributed among clients 108. In one or more embodiments, each client 108 can have a different allocation of IOPS based on the quality of service agreement with that client.

Figure 7C:
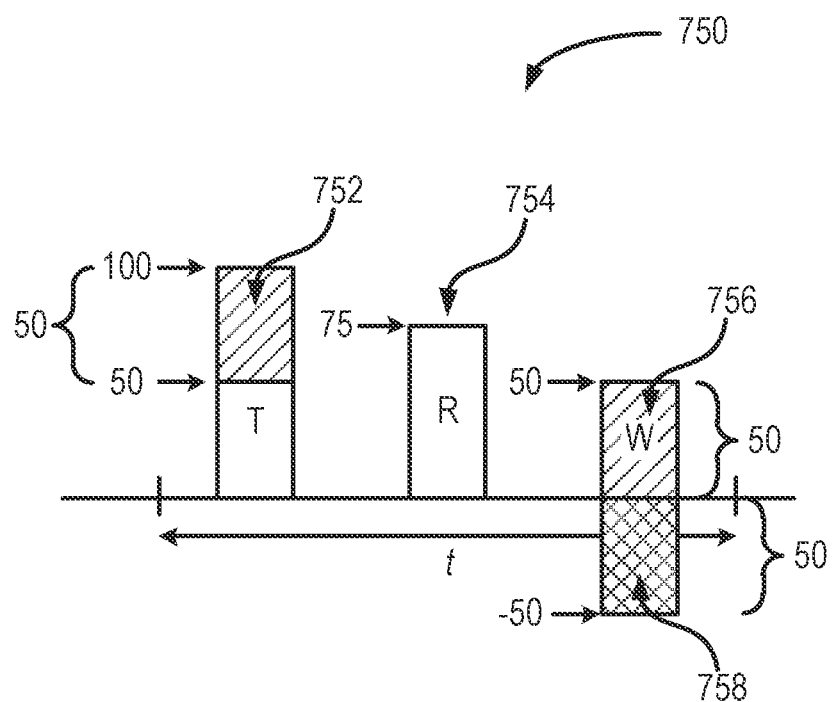
FIG. 7C shows example target IOPS associated with a client over a time period in accordance with an illustrative implementation.
Figure 7B:
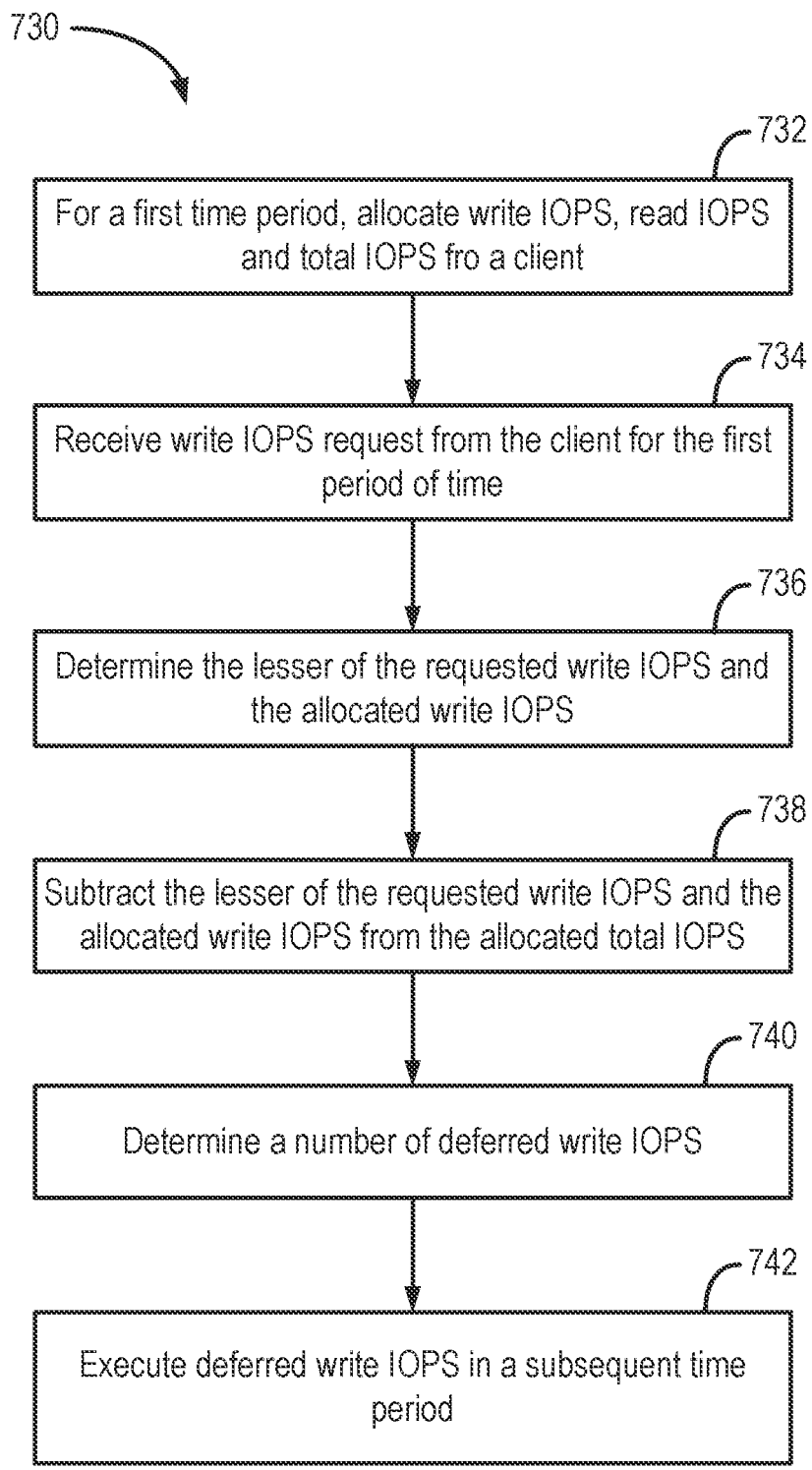
FIG. 7B shows an example flow diagram of a process for independent control of read IOPS and write IOPS associated with a client in accordance with an illustrative implementation.

FIG. 7B shows an example flow diagram of a process 730 for independent control of read IOPS and write IOPS associated with a client. In particular, the process 730 can be executed by the performance manager 114 discussed above in relation to FIG. 1A. In one or more embodiments, the target performance manager 402 shown in FIG. 4 can be used to execute the process 730 to generate a set of client target performance values. In some such embodiments, the target performance values generated by the target perfom1ance manager 402 can be directly fed to the performance controller 406 without being modified by the PID controller block 404. FIG. 7C shows example target IOPS 750 associated with a client over a time period t. In particular, the target IOPS 750 illustrate a result of the execution of the process 730 shown in FIG. 7B, which result includes target total IOPS 902, target read IOPS 904, and target write IOPS 906. The process 730 shown in FIG. 7B is discussed in detail below in conjunction with the allocated IOPS 700 shown in FIG. 7 A and the target IOPS 750 shown in FIG. 7C.

In some embodiments, after the client target performance values are calculated for a client, the process 730 includes, for a first time period, allocating write IOPS, read IOPS, and total IOPS for a client (operation 732). As discussed above in relation to FIG. 7A, the client can be allocated a given number of total IOPS, read IOPS and write IOPS. Specifically, FIG. 7A shows an example in which the client is allocated 100 total IOPS, 75 read IOPS, and 50 write IOPS.

The process 730 also includes receiving write IOPS request from the client for the first time period (operation 734). As discussed above in relation to FIGS. 1A and 1B, a client 108 can request writing to client data stored in the storage 116. Typically, the client 108 will issue a write request to the metadata server 110, where the request can include the data to be written along with addressing information including, for example, the file name, the object name, or the block number, associated with client data stored in the storage 116. The metadata server 110 can translate the client addressing information into block layer addressing that can be understood by the block server 112 associated with the storage 116. The metadata server 110 also can determine the number of IOPS needed to write the client data into the storage. The number of IOPS can be determined based on, for example, the size of the IOPS handled by the block server 112. In one or more embodiments, the number of IOPS for a given client data to be written in the storage 116 is an inverse function of the size of the IOPS handled by the block server 112. The example in FIG. 9 assumes that the number of requested write TOPS corresponding to the requested client data write is equal to 100 write IOPS. It is understood that number of write TOPS can be different in other cases.

The process 730 further includes determining the lesser of the requested write IOPS and the allocated write IOPS (operation 736). This operation compares the number of requested IOPS to the number of allocated write TOPS. For example, as shown in FIG. 7C, the number of requested write IOPS (100) is greater than the number of allocated write TOPS (50). Thus, the allocated write IOPS is the lesser of the number of requested write IOPS and the number of allocated write IOPS. Further, the target write IOPS 756 is equated to the lesser of the requested write IOPS and the allocated write IOPS, that is, the allocated write IOPS (50). Of course, if the requested write IOPS were less than the allocated write IOPS (for example, if the requested number of write IOPS were 40 and the allocated write IOPS were 50), then the number of requested write IOPS would be the lesser of the number of requested write IOPS and the number of allocated write IOPS. Therefore, the number of target write IOPS 756 would be set to the number of requested write IOPS (40). It is noted that while the number of requested write IOPS of 100 is equal to the total number of allocated IOPS of 100, the allocation of only 50 write IOPS precludes the client from receiving more than 50 write IOPS for that particular time period t.

The process 730 also includes subtracting the lesser of the requested write IOPS and the allocated write IOPS from the allocated total IOPS (operation 738). In other words, the number of target write IOPS are subtracted from the number of allocated total IOPS. As shown in FIG. 7C, the 50 target write IOPS 756 are subtracted from the 100 allocated total IOPS to result in the target total IOPS 752 of 50. The target total IOPS 752 is indicated by the shaded region between 100 and 50.

The process further includes detem1ining a number of deferred write IOPS (operation 740). The number of deferred write IOPS is determined by determining the difference between the number of requested write IOPS and the number of target write IOPS. For example, referring to FIG. 7C, the number of target write IOPS is indicated by the first shaded region 756. Subtracting the number of requested write IOPS (100) from the target write IOPS (50) 756 results in a negative number: −50. The absolute (50) of the resulting number (−50) indicates the number of deferred write IOPS 758. These deferred write IOPS indicate the number of write IOPS that are to be handled in a subsequent time period (operation 742). For example, the deferred write IOPS can be executed in a subsequent time period in a manner similar to that discussed above in relation to the requested write IOPS. Thus, if the number of allocated write IOPS in a subsequent time period is san1e (50) as that shown in FIG. 7A, then the deferred write IOPS can be executed in that subsequent time period. The management processor 114 may also take into account newly requested write IOPS during that subsequent time period to determine the target total and write IOPS.

It is noted that if the number of requested write IOPS is less than the number of allocated write IOPS, then there will be no deferred write IOPS. For example, if the number of number of requested write IOPS were 40, instead of 100, then the number of target write IOPS would be equal to 40, which can be accommodated by the number (50) of allocated write IOPS.

The resulting number of target total IOPS (50) leaves an additional number (50) of allocated IOPS that can be utilized by any read IOPS requested by the client. Thus, if the client 108 requests 50 read IOPS during the time period t, because the requested 50 read IOPS can be accommodated by both the allocated read IOPS (75) and the remaining allocated total IOPS (50), the requested read IOPS can be executed. It is noted that in some embodiments, the performance manager 114 may be configured to execute the requested write IOPS even if the number of requested write IOPS is greater than the number of allocated write IOPS as long as the number is less than or equal to the number of allocated total IOPS. For example, referring again to the above discussed example of receiving 100 requested write IOPS, as this number is equal to the 100 allocated total IOPS, the management processor 114 may set the target write IOPS to the requested write IOPS. In such instances, the number of allocated total IOPS would be completely exhausted for the time period t. As a result, any read IOPS requested by the client during the time period t would be denied by the management processor 114. The process 730 discussed above allows the management processor 114 to leave room for execution of read IOPS irrespective of the number of requested write IOPS.

The independent control of reads and writes can also be used when a storage system reaches a certain amount of free space. When the storage system reaches a critical level of free space, e.g., 5%, 10%, 12% of free system space and/or drive space, the system can throttle all client writes by lowering the write IOPS for the system. Such action will slow down the number of writes to the system that will further decrease the amount of free space. This allows for data to be moved off of the cluster and/or drive. In one embodiment, when this condition occurs a new cluster for one or more volumes is selected. The data from the one or more volumes are moved from the current cluster/drive and moved to the new cluster. To help facilitate this, the read IOPS of the original system can be set high to ensure that reads of the data are allowed and the write IOPS of the new cluster can be set to high at both the system level and the client level to ensure that the writes to the new cluster are not throttled. Once the data is moved to the new system, the data be deleted from the original system to free up space. In some embodiments, deletion of data can be either a write operation or considered a metadata only operation.

In various embodiments, metadata IO can be controlled independently of data 10. In one or more embodiments, the process 730 discussed above can be carried out in conjunction with the system level performance management, as discussed above in relation to the method 600 shown in FIG. 6. In particular, the performance manager 114 can throttle the allocation of the total number of IOPS based on the current performance of the system, but allocate the read IOPS 704 and write IOPS 706 independently of the allocation of the total number of IOPS. In this manner, the performance manager 114 can throttle the allocation of the total number of IOPS 702 based on the system performance, as discussed in the method shown in FIG. 6, and in addition determine the target write IOPS 756 and deferred IOPS 758 based on the process 730 shown in FIG. 7B. In some other embodiments, the total IOPS, the read IOPS, and the write IOPS may all be throttled independently of each other based on the current performance of the system.

While the allocation of IOPS 700 shown in FIG. 7A is associated with the data associated with the client, the performance manager 114 also can maintain an allocation of IOPS for metadata access IO, including both reads and writes, or separate allocations for metadata reads and metadata writes. As discussed above in relation to FIGS. 1A and 1B, the metadata layer 104 can include metadata servers 110 or in some embodiments can include volume servers 114. The metadata servers 110 and the volume servers 114 translate the addressing scheme used by the client 108 into corresponding block server layer addressing scheme associated with the block server layer 106. The metadata severs 110 and the volume servers 114 can maintain mapping information that map the client addressing scheme to the block layer addressing scheme. The mapping information is typically stored as metadata in the metadata servers 110 or the volume servers 114. In one or more embodiments, the metadata can be stored in centralized storage, which can be accessed by one or more metadata severs 110 or volume servers 114 within the metadata layer 104. Accessing the metadata can include reading and writing. In one or more embodiments, the size of the metadata, and the number of IOPS associated with the read/write transactions between the metadata server 110 and metadata storage can be very large. In one or more such embodiments, the performance of the system can he impacted by not only the read and write IOPS associated with client data, but also due to the reads and write IOPS associated with the metadata.

In one or more embodiments, total, read, and write IOPS can be allocated to the metadata servers 110 or volume servers 114 for accessing metadata in a manner similar to that discussed above in relation to accessing client data. For example, a metadata performance manager, similar to the performance manager 114, can be used to manage system performance based on the metadata IOPS. The metadata performance manager can allocate total IOPS, read IOPS, and write IOPS for a metadata server 110 or a volume server 114. The metadata performance server can receive requested read and write TOPS from the metadata server 110 or the volume server 114 just as the performance manager 114 received read and write IOPS requests from clients. In a manner similar to the process 730 discussed above in relation to the performance manager 114, the metadata performance manager also can determine target read IOPS, target write IOPS and target total IOPS associated with metadata access. For example, the metadata performance manager can limit the number of target metadata write IOPS from exceeding the total metadata IOPS within a time period such that there are at least some room for executing any received metadata read IOPS during the same time period. The metadata performance manager can further dctcm1inc deferred metadata write IOPS in cases where the requested metadata write IOPS exceeds the allocated metadata write IOPS in a manner similar to that discussed above in relation to client data write IOPS in FIGS. 7A-7C.

In one or more embodiments, the metadata performance manager can dynamically change the allocated total, read, and write IOPS based on the system perfom1ance. In one or more embodiments, the metadata performance manager can receive system metrics as well as metadata metrics (such as, for example, metadata read/write IOPS, metadata storage capacity, or bandwidth) as inputs to determine the current load of the system and based on the determined current load and the system reallocate the total, read, and write IOPS. As one example, metadata access can be increased during certain system level operations, such as moving one or more volumes to another cluster or storage device.

Load Value Calculations

Load values can be used to determine if a client should be throttled to help ensure QoS among all clients. Various load values can be calculated based upon one or more system metric and/or client metric. As an example, a load value can be calculated that corresponds to a client's data read latency.

When calculating a load value that corresponds with a client, how the client's data is managed on the storage system becomes important.

Figure 9:
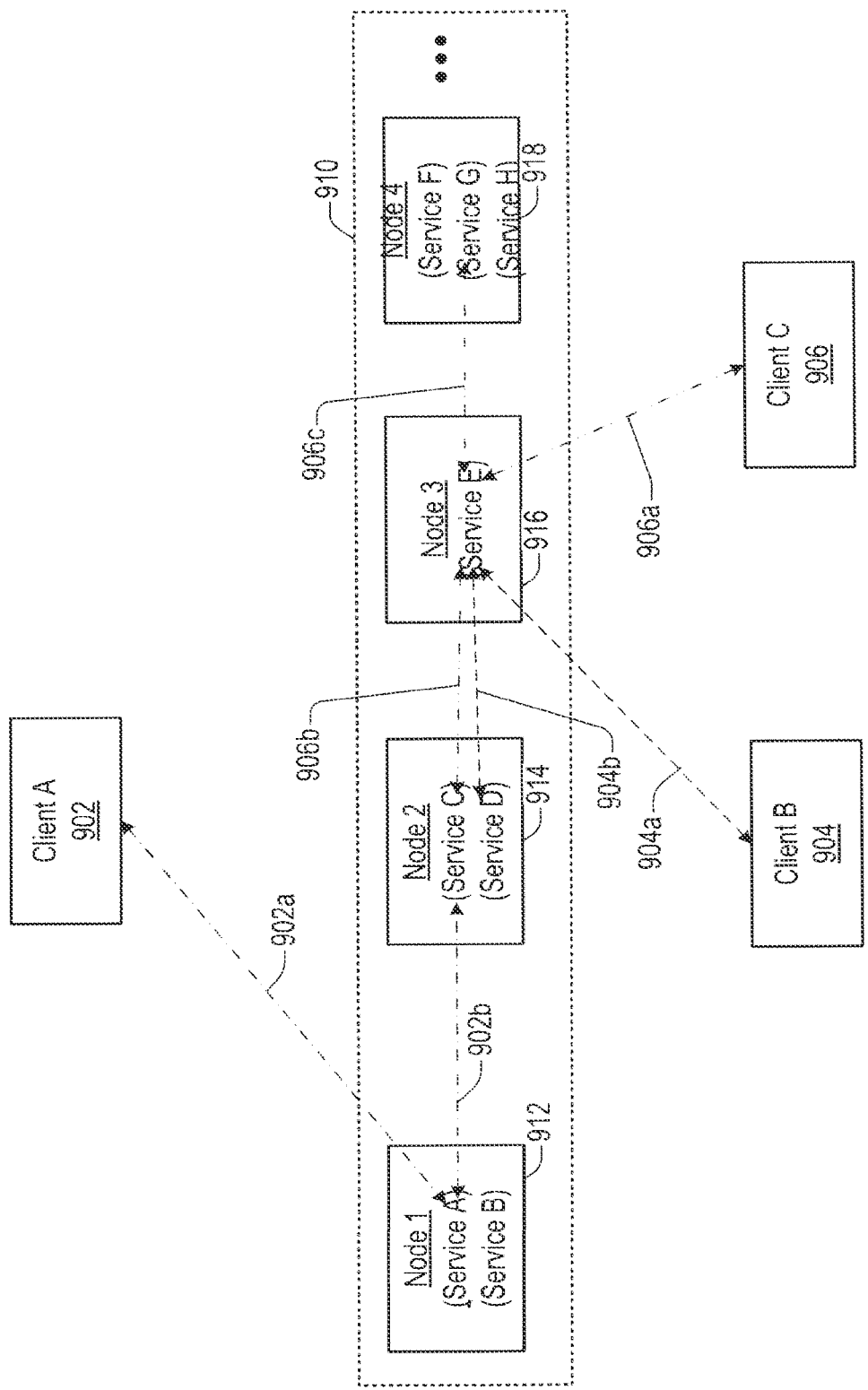
FIG. 9 shows a portion of a storage system in accordance with an illustrative implementation.

FIG. 9 shows a portion of a storage system in accordance with one illustrative implementation. In the specific example embodiment of FIG. 9, the storage system is shown to include a cluster 910 of nodes (912, 914, 916, and 918). According to different embodiments, each node may include one or more storage devices such as, for example, one or more solid state drives (SSDs). In the example embodiment of FIG. 9, it is assumed for purposes of illustration that three different clients (e.g., Client A 902, Client B 904, and Client C 906) are each actively engaged in the reading/writing of data from/to storage cluster 910.

Additionally, as illustrated in the example embodiment of FIG. 9, each node may have associated therewith one or more services (e.g., Services A-H), wherein each service may be configured or designed to handle a particular set of functions and/or tasks. For example, as illustrated in the example embodiment of FIG. 9: Services A and B may be associated with (and/or may be handled by) Node 1 (912); Services C and D may be associated with (and/or may be handled by) Node 2 (914); Service E may be associated with (and/or may be handled by) Node 3 (916); Services F, G, H may be associated with (and/or may be handled by) Node 4 (918). In at least one embodiment, one or more of the services may be configured or designed to implement a slice server. A slice server can also be described as providing slice service functionality.

Additionally, according to different embodiments, a given service may have associated therewith at least one primary role and further may have associated therewith one or more secondary roles. For example, in the example embodiment of FIG. 9, it is assumed that Service A has been configured or designed to include at least the following functionality: (1) a primary role of Service A functions as the primary slice service for Client A, and (2) a secondary role of Service A handles the data/metadata replication tasks (e.g., slice service replication tasks) relating to Client A, which, in this example involves replicating Client A's write requests (and/or other slice-related metadata for Client A) to Service C. Thus, for example, in one embodiment, write requests initiated from Client A may be received at Service A 902a, and in response, Service A may perform and/or initiate one or more of the following operations (or combinations thereof):

process the write request at Service A's slice server, which, for example, may include generating and storing related metadata at Service A's slice server;
  (if needed) cause the data (of the write request) to be saved in a first location of block storage (e.g., managed by Service A);
  forward (902b) the write request (and/or associated data/metadata) to Service C for replication.

In at least one embodiment, when Service C receives a copy of the Client A write request, it may respond by processing the write request at Service C's slice server, and (if needed) causing the data (of the write request) to be saved in a second location of block storage (e.g., managed by Service C) for replication or redundancy purposes. In at least one embodiment, the first and second locations of block storage may each reside at different physical nodes. Similarly Service A's slice server and Service C's slice server may each be implemented at different physical nodes.

Accordingly, in the example embodiment of FIG. 9, the processing of a Client A write request may involve two distinct block storage write operations-one initiated by Service A (the primary Service) and another initiated by Service C (the redundant Service). On the other hand, the processing of a Client A read request may only be handled by Service A (e.g., under normal conditions) since Service A is without involving Service C) since Service A is able to handle the read request without necessarily involving Service C.

For purposes of illustration, in the example embodiment of FIG. 9, it is also assumed that Service E has been configured or designed to include at least the following functionality: (1) a primary role of Service E functions as the primary slice service for Client B, and (2) a secondary role of Service E handles the data and/or metadata replication tasks (e.g., slice service replication tasks) relating to Client B, which, in this example involves replicating Client B's write requests (and/or other Slice-related metadata for Client B) to Service D. Thus, for example, in one embodiment, write requests initiated from Client B may be received at Service E 904a, and in response, Service E may perform and/or initiate one or more of the following operations (or combinations thereof):

process the write request at Service E's slice server, which, for example, may include generating and storing related metadata at Service E" s slice server;
  (if needed) cause the data (of the write request) to be saved in a first location of block storage (e.g., managed by Service E);
  forward (904b) the write request (and/or associated data/metadata) to Service D for replication.

In at least one embodiment, when Service D receives a copy of the Client B write request, it may respond by processing the write request at Service D's slice server, and (if needed) causing the data (of the write request) to be saved in a second location of block storage (e.g., managed by Service D) for replication or redundancy purposes. In at least one embodiment, the first and second locations of block storage may each reside at different physical nodes. Similarly Service E's slice server and Service D's slice server may each be implemented at different physical nodes.

According to different embodiments, it is also possible to implement multiple replication (e.g., where the data/metadata is replicated at two or more other locations within the storage system/cluster). For example, as illustrated in the example embodiment of FIG. 9, it is assumed that Service E has been configured or designed to include at least the following functionality: (1) a primary role of Service E functions as the primary slice service for Client C, (2) a secondary role of Service E handles the data and/or metadata replication tasks (e.g., slice service replication tasks) relating to Client C, which, in this example involves replicating Client C's write requests (and/or other Slice-related metadata for Client C) to Service C; and (3) a secondary role of Service E handles the data and/or metadata replication tasks (e.g., slice service replication tasks) relating to Client C, which, in this example involves replicating Client C's write requests (and/or other Slice-related metadata for Client C) to Service G. Thus, for example, in one embodiment, write requests initiated from Client C may be received at Service E 906a, and in response, Service E may perform and/or initiate one or more of the following operations (or combinations thereof):

process the write request at Service E's slice server, which, for example, may include generating and storing related metadata at Service E's slice server;
  (if needed) cause the data (of the write request) to be saved in a first location of block storage (e.g., managed by Service E);

forward (906b) the write request (and/or associated data/metadata) to Service C for replication;

forward (906c) the write request (and/or associated data/metadata) to Service G for replication.

In at least one embodiment, when Service C receives a copy of the Client C write request, it may respond by processing the write request at Service C's slice server, and (if needed) causing the data (of the write request) to be saved in a second location of block storage (e.g., managed by Service C) for replication or redm1dancy purposes. Similarly, In at least one embodiment, when Service G receives a copy of the Client C write request, it may respond by processing the write request at Service G's slice server, and (if needed) causing the data (of the write request) to be saved in a third location of block storage (e.g., managed by Service G) for replication or redundancy purposes.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to;" the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, R and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A method for managing input-output operations per second (IOPS) for a storage system connected to a client, comprising:

receiving, at the storage system, a number of allocated total IOPS, a number of allocated read IOPS and a number of allocated write TOPS for the client accessing the storage system;

receiving, at the storage system, a requested number of write IOPS associated with one or more client requests to write to the storage system;

determining, at the storage system, a target number of write TOPS based on the number of allocated total IOPS and the number of allocated write IOPS; and regulating, by the storage system, a client write IOPS using a proportional-integral-derivative controller to match the determined target number of write TOPS within a first time period based on feedback of the requested number of write IOPS without increasing a latency of one or more client read requests associated with the first time period.

2. The method of claim 1, wherein regulating the client write IOPS is implemented by locking out access to volumes at the storage system by the client.

3. The method of claim 1, further comprising determining a deferred number of client write TOPS based on a difference between the number of allocated write IOPS and the requested number of write IOPS, and assigning the deferred number of write IOPS for execution in a second time period after the first time period.

4. The method of claim 1, further comprising determining the number of allocated total IOPS based on at least one of a read latency and a write latency associated with the storage system and at least one quality of service parameter associated with the client.

5. The method of claim 1, further comprising determining the number of allocated total IOPS based on a space utilization of the storage system and at least one of a bandwidth and a latency as a quality of service associated with the client.

6. The method of claim 1, further comprising determining the number of allocated total IOPS dynamically based on a change in at least one of a read latency and a write latency of the storage system.

7. The method of claim 1, further comprising adjusting the target number of write IOPS based on a load value associated with storage drives of the storage system.

8. The method of claim 1, further comprising regulating, by the storage system, a client read IOPS separately from the regulation of the client write IOPS.

9. The method of claim 8, wherein regulating the client write IOPS to match the determined target number of write IOPS further comprises throttling the client access to the storage system based on a minimum IOPS and a maximum IOPS associated with the client.

10. A system comprising:
a storage system having data accessible by a client;
a processor coupled to the storage system; and
a non-transitory computer-readable media, coupled to the processor storing instructions that when executed by the processor cause the system to:
receive a number of allocated total input-output operations per second (IOPS), a number of allocated read IOPS and a number of allocated write IOPS for the client accessing the storage system, receive a requested number of write IOPS associated with one or more client requests to write to the storage system, determine a target number of write IOPS based on the number of allocated total IOPS and the number of allocated write IOPS, and regulate client write IOPS using a proportional-integral-derivative controller to match the determined target number of write IOPS within a first time period based on feedback of the requested number of write IOPS without increasing a latency of one or more client read requests associated with the first time period.

11. The system of claim 10, wherein regulation of the client write IOPS is implemented by locking out access to volumes at the storage system by the client.

12. The system of claim 10, wherein execution of the instructions by the processor further cause the system to determine a deferred number of write IOPS based on a difference between the number of allocated write IOPS and the requested number of write IOPS, and assign the deferred number of write IOPS for execution in a second time period after the first time period.

13. The system of claim 10, wherein execution of the instructions by the processor further cause the system to determine the number of allocated total IOPS based on at least one of a read latency and a write latency associated with the storage system and at least one quality of service parameter associated with the client.

14. The system of claim 10, wherein execution of the instructions by the processor further cause the system to determine the number of allocated total IOPS based on a space utilization of the storage system and at least one of a bandwidth and a latency as a quality of service associated with the client.

15. The system of claim 10, wherein execution of the instructions by the processor further cause the system to dynamically determine the number of allocated total IOPS based on a change in at least one of a read latency and a write latency of the storage system.

16. The system of claim 10, wherein execution of the instructions by the processor further cause the system to regulate a client read IOPS separately from regulation of the client write IOPS.

17. The system of claim 10, wherein regulation of the client write IOPS to match the determined target number of write IOPS further comprises throttling the client access to the storage system based on a minimum IOPS and a maximum IOPS associated with the client.

18. The system of claim 10, wherein execution of the instructions by the processor further cause the system to adjust the target number of write IOPS based on a load value associated with storage drives of the storage system.

19. The system of claim 10, wherein execution of the instructions by the processor further cause the system to use client load values to regulate the client write IOPS.

20. A non-transitory computer readable medium containing executable program instructions that when executed by a processor of a storage system cause the storage system to:
receive a number of allocated total input-output operations per second (IOPS), a number of allocated read IOPS and a number of allocated write IOPS of a storage system;
determine a target number of write IOPS of a client accessing the storage system based on the number of allocated total IOPS and the number of allocated write IOPS; and
regulate a client write IOPS using a proportional-integral-derivative controller to match the determined target number of write IOPS within a time period based on feedback of a current write IOPS of the client without increasing a latency of one or more client read requests associated with the time period.

21. The non-transitory computer readable medium of claim 20, wherein regulation of the client write IOPS is implemented by locking out access by the client to volumes at the storage system.

22. The non-transitory computer readable medium of claim 20, wherein the executable program instructions further cause the storage system to:
determine a deferred number of client write IOPS based on a difference between the number of allocated write IOPS and the requested number of write IOPS; and
assign the deferred number of write IOPS for execution by the storage system in a second time period after the first time period.

23. The non-transitory computer readable medium of claim 20, wherein the number of allocated total IOPS is determined based on at least one of a read latency and a write latency associated with the storage system and at least one quality of service parameter associated with the client.

24. The non-transitory computer readable medium of claim 20, wherein the number of allocated total IOPS is determined based on a space utilization of the storage system and at least one of a bandwidth and a latency as a quality of service associated with the client.

25. The non-transitory computer readable medium of claim 20, wherein the number of allocated total IOPS is determined dynamically based on a change in at least one of a read latency and a write latency of the storage system.

26. The non-transitory computer readable medium of claim 20, wherein the executable program instructions further cause the storage system to adjust the target number of write IOPS based on a load value associated with storage drives of the storage system.

27. The non-transitory computer readable medium of claim 20, wherein the executable program instructions further cause the storage system to regulate a client read IOPS separately from regulation of the client write IOPS.

28. The non-transitory computer readable medium of claim 27, wherein regulation of the client write IOPS to match the determined target number of write IOPS further comprises throttling the client access to the storage system based on a minimum IOPS and a maximum IOPS associated with the client.

\* \* \* \* \*

UNITED STATES PATENT AND TRADEMARK OFFICE
CERTIFICATE OF CORRECTION

| | | |
|---|---|---|
| PATENT NO. | : 11,327,910 B2 | Page 1 of 1 |
| APPLICATION NO. | : 17/203094 | |
| DATED | : May 10, 2022 | |
| INVENTOR(S) | : Austino Longo and Jared Cantwell | |

It is certified that error appears in the above-identified patent and that said Letters Patent is hereby corrected as shown below:

In the Claims

Column 28, Lines 50, 56 and 60: Claim 1 delete "TOPS" and insert --IOPS--
Column 29, Line 2: Claim 3 delete "TOPS" and insert --IOPS--

Signed and Sealed this
Twenty-eighth Day of June, 2022

Katherine Kelly Vidal
*Director of the United States Patent and Trademark Office*